(12) United States Patent
Reybok et al.

(10) Patent No.: US 11,704,405 B2
(45) Date of Patent: *Jul. 18, 2023

(54) TECHNIQUES FOR SHARING NETWORK SECURITY EVENT INFORMATION

(71) Applicant: ServiceNow, Inc., Santa Clara, CA (US)

(72) Inventors: Richard Reybok, Fremont, CA (US); Andreas Seip Haugsnes, Mountain View, CA (US); Kurt Joseph Zettel, II, Nashville, TN (US); Jeffrey Rhines, San Antonio, TX (US); Henry Geddes, Corte Madera, CA (US); Volodymyr Osypov, Mountain View, CA (US); Scott Lewis, Sunnyvale, CA (US); Sean Brady, Bedford, NH (US); Mark Manning, Redwood City, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/457,152

(22) Filed: Dec. 1, 2021

(65) Prior Publication Data
US 2022/0083653 A1 Mar. 17, 2022

Related U.S. Application Data

(63) Continuation of application No. 16/827,127, filed on Mar. 23, 2020, now Pat. No. 11,222,111, which is a
(Continued)

(51) Int. Cl.
*G06F 21/55* (2013.01)
*H04L 9/40* (2022.01)

(52) U.S. Cl.
CPC ......... *G06F 21/552* (2013.01); *H04L 63/145* (2013.01)

(58) Field of Classification Search
CPC .................................................. G06F 21/552
See application file for complete search history.

(56) References Cited

U.S. PATENT DOCUMENTS

| 6,609,122 B1 | 8/2003 | Ensor |
| 6,816,898 B1 | 11/2004 | Scarpelli |

(Continued)

*Primary Examiner* — William S Powers
(74) *Attorney, Agent, or Firm* — Fletcher Yoder PC

(57) ABSTRACT

This disclosure provides techniques for pooling and searching network security events reported by multiple sources. As information representing a security event is received from one source, it is searched against a central or distributed database representing events reported from multiple, diverse sources (e.g., different client networks). Either the search or correlated results can be filtered and/or routed according at least one characteristic associated with the networks, for example, to limit correlation to events reported by what are presumed to be similarly situated networks. The disclosed techniques facilitate faster identification of high-relevancy security event information, and thereby help facilitate faster threat identification and mitigation. Various techniques can be implemented as standalone software (e.g., for use by a private network) or for a central pooling and/or query service. This disclosure also provides different examples of actions that can be taken in response to search results.

20 Claims, 9 Drawing Sheets

Related U.S. Application Data continuation of application No. 16/151,085, filed on Oct. 3, 2018, now Pat. No. 10,628,582, which is a continuation of application No. 16/042,918, filed on Jul. 23, 2018, now abandoned, which is a continuation of application No. 15/651,924, filed on Jul. 17, 2017, now Pat. No. 10,032,020, which is a continuation of application No. 14/615,202, filed on Feb. 5, 2015, now Pat. No. 9,710,644, and a continuation-in-part of application No. 14/536,386, filed on Nov. 7, 2014, now Pat. No. 9,038,183, which is a continuation of application No. 13/556,553, filed on Jul. 24, 2012, now Pat. No. 8,914,406, said application No. 15/651,924 is a continuation of application No. 13/556,524, filed on Jul. 24, 2012.

(60) Provisional application No. 62/061,111, filed on Oct. 7, 2014, provisional application No. 62/046,431, filed on Sep. 5, 2014, provisional application No. 61/593,853, filed on Feb. 1, 2012.

(56) References Cited

U.S. PATENT DOCUMENTS

| | | | |
|---|---|---|---|
| 7,020,706 B2 | 3/2006 | Cates | |
| 7,028,301 B2 | 4/2006 | Ding | |
| 7,062,683 B2 | 6/2006 | Warpenburg | |
| 7,131,037 B1 | 10/2006 | LeFaive | |
| 7,152,164 B1 * | 12/2006 | Loukas | G06F 21/56 713/188 |
| 7,170,864 B2 | 1/2007 | Matharu | |
| 7,350,209 B2 | 3/2008 | Shum | |
| 7,610,512 B2 | 10/2009 | Gerber | |
| 7,617,073 B2 | 11/2009 | Trinon | |
| 7,689,628 B2 | 3/2010 | Garg | |
| 7,716,353 B2 | 5/2010 | Golovinsky | |
| 7,769,718 B2 | 8/2010 | Murley | |
| 7,783,744 B2 | 8/2010 | Garg | |
| 7,890,209 B2 | 2/2011 | Gerber | |
| 7,925,981 B2 | 4/2011 | Pourheidari | |
| 7,930,396 B2 | 4/2011 | Trinon | |
| 7,945,860 B2 | 5/2011 | Vambenepe | |
| 7,966,398 B2 | 6/2011 | Wiles | |
| 8,051,164 B2 | 11/2011 | Peuter | |
| 8,224,683 B2 | 7/2012 | Manos | |
| 8,266,096 B2 | 9/2012 | Navarrete | |
| 8,402,127 B2 | 3/2013 | Solin | |
| 8,457,928 B2 | 6/2013 | Dang | |
| 8,478,569 B2 | 7/2013 | Scarpelli | |
| 8,612,408 B2 | 12/2013 | Trinon | |
| 8,674,992 B2 | 3/2014 | Poston | |
| 8,689,241 B2 | 4/2014 | Naik | |
| 8,743,121 B2 | 6/2014 | De Peuter | |
| 8,832,652 B2 | 9/2014 | Mueller | |
| 8,887,133 B2 | 11/2014 | Behnia | |
| 8,914,406 B1 * | 12/2014 | Haugsnes | H04L 63/1441 707/769 |
| 9,065,783 B2 | 6/2015 | Ding | |
| 9,098,322 B2 | 8/2015 | Apte | |
| 9,122,552 B2 | 9/2015 | Whitney | |
| 9,137,258 B2 * | 9/2015 | Haugsnes | G06F 16/24575 |
| 9,239,857 B2 | 1/2016 | Trinon | |
| 9,317,327 B2 | 4/2016 | Apte | |
| 9,363,252 B2 | 6/2016 | Mueller | |
| 9,535,737 B2 | 1/2017 | Joy | |
| 9,557,969 B2 | 1/2017 | Sharma | |
| 9,645,833 B2 | 5/2017 | Mueller | |
| 9,654,473 B2 | 5/2017 | Miller | |
| 9,766,935 B2 | 9/2017 | Kelkar | |
| 9,792,387 B2 | 10/2017 | George | |
| 9,805,322 B2 | 10/2017 | Kelkar | |
| 9,819,729 B2 | 11/2017 | Moon | |
| 2003/0055689 A1 * | 3/2003 | Block | G06Q 20/206 705/5 |
| 2009/0178139 A1 * | 7/2009 | Stute | G06Q 10/109 726/22 |
| 2009/0328206 A1 * | 12/2009 | Bardsley | G06F 21/577 726/22 |
| 2011/0173699 A1 * | 7/2011 | Figlin | H04L 63/1441 726/23 |

* cited by examiner

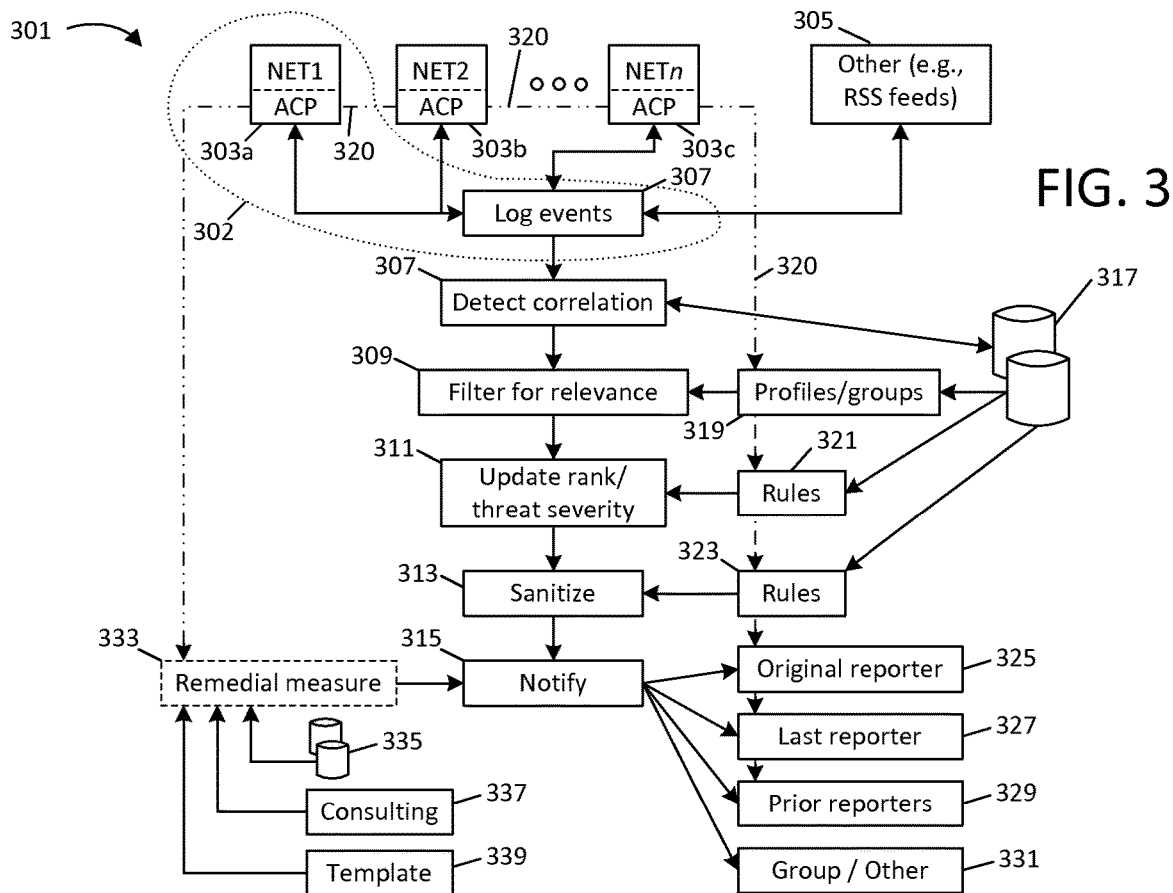
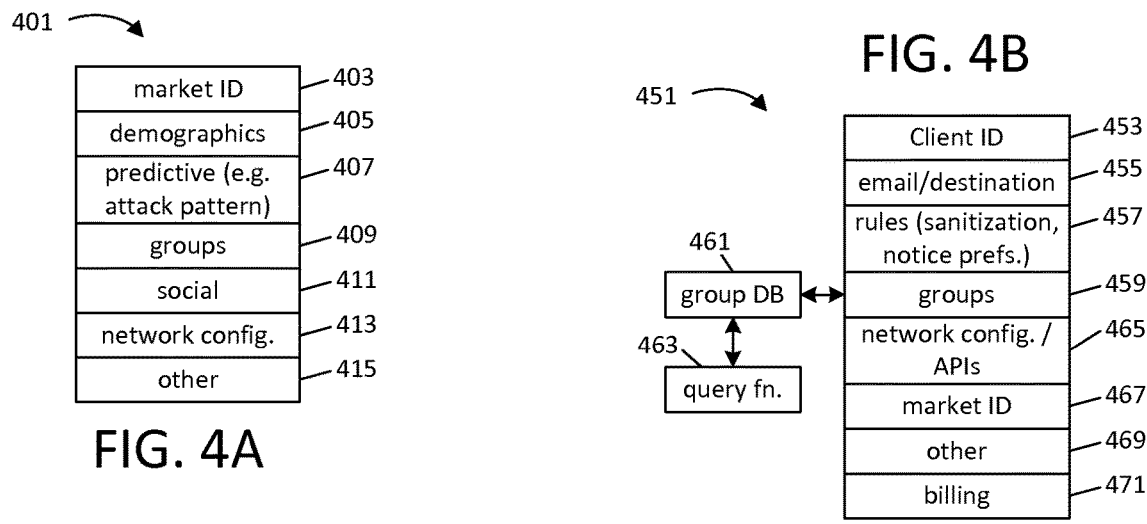

TECHNIQUES FOR SHARING NETWORK SECURITY EVENT INFORMATION

TECHNIQUES FOR SHARING NETWORK SECURITY EVENT INFORMATION

This application claims the benefit of and is a continuation of U.S. patent application Ser. No. 16/827,127 filed Mar. 23, 2020, on behalf of first-named inventor Richard Reybok for "TECHNIQUES FOR SHARING NETWORK SECURITY EVENT INFORMATION", which is a continuation of U.S. patent application Ser. No. 16/151,085 filed Oct. 3, 2018, on behalf of first-named inventor Richard Reybok for "TECHNIQUES FOR SHARING NETWORK SECURITY EVENT INFORMATION", now U.S. Pat. No. 10,628,582, which is a continuation of U.S. patent application Ser. No. 16/042,918 filed Jul. 23, 2018, on behalf of first-named inventor Richard Reybok for "TECHNIQUES FOR SHARING NETWORK SECURITY EVENT INFORMATION", which is a continuation of U.S. patent application Ser. No. 15/651,924 filed Jul. 17, 2017 on behalf of first-named inventor Richard Reybok for "TECHNIQUES FOR SHARING NETWORK SECURITY EVENT INFORMATION", now U.S. Pat. No. 10,032,020, which is a continuation of U.S. patent application Ser. No. 14/615,202 filed Feb. 5, 2015 on behalf of first-named inventor Andreas Seip Haugsnes for "TECHNIQUES FOR SHARING NETWORK SECURITY EVENT INFORMATION", now U.S. Pat. No. 9,710,644, which claims the benefit of U.S. Provisional Patent Application No. 62/061111, filed on Oct. 7, 2014 on behalf of first-named inventor Richard Reybok for "Techniques for Sharing Network Security Event Information." This application also claims the benefit of U.S. Provisional Patent Application No. 62/046431, filed on Sep. 5, 2014 on behalf of first-named inventor Andreas Seip Haugsnes for "Techniques for Sharing Network Security Event Information." Also U.S. patent application Ser. No. 14/615202 is a continuation in-part of U.S. Utility Patent Application Nos. 13/556524 ("Scalable Network Security Detection and Prevention Platform," filed Jul. 24, 2012) and 14/536386 (Scalable Network Security With Fast Response Protocol," filed Nov. 7, 2014, now U.S. Pat. No. 9,038,183), both having a first-named inventor of Andreas Haugsnes; U.S. Utility patent application Ser. No. 14/536386 is a continuation of U.S. Utility patent application Ser. No. 13/556553 ("Scalable Network Security With Fast Response Protocol," filed Jul. 24, 2012, now U.S. Pat. No. 8,914,406). The aforementioned utility patent applications each also claim priority to U.S. Provisional Application No. 61/593,853, filed Feb. 1, 2012 on behalf of inventor Andreas Haugsnes, and entitled "SCALABLE NETWORK SECURITY DETECTION AND PREVENTION PLATFORM." Each of the foregoing prior applications is hereby incorporated by reference.

BACKGROUND

Private networks are at risk to directed attacks that attempt to overwhelm services, discover passwords and other valuable information, and otherwise misuse private network resources. Many private networks possess a network security function intended to thwart these attacks; for example, networks may rely on employed or contracted network security professionals, armed with a vast array of security software tools, to monitor various types of network activities, to discriminate legitimate network activity from attacks, and to hopefully identify and stop attacks and avert any damage in the process.

Despite these efforts and the sophistication of available tools, a network security administrator and/or system typically faces a daunting task of sifting through vast quantities of information representing legitimate or low-risk network activity in order to identify relevant threats; all too often, the relevance of specific information is only detected once damage has already occurred. That is, in most cases (including notable high-profile "credit card number theft" cases from major retailers), network administrators typically possessed specific information identifying each attack months ahead of time, when the attack was first begun, but failed to take adequate corrective action at the time because those administrators remained unaware of the presence and relevance of the information reflecting the attacks. It is also noted that attackers are often organized, collaborating in a manner where a pattern of attack is replicated and/or coordinated from multiple sources and locations; that is, directed attacks are often organized in the sense that the same attack pattern is often used in succession or parallel against many different targeted networks.

Attempts have been made to share information about attacks across targeted networks, for example, so that one network administrator can learn about attacks against other, similarly situated networks, and thus either take preemptive action or be put in a position to be alerted to the relevance of specific, actionable information before or as activity occurs. Such attempts have generally met with mixed results. The most common mechanism for the sharing of potential threat information is in the form of posted, open-community forums or information feeds, where any shared information is usually manually selected by an unknown group of personnel. From the vantage point of a subscriber to such a community or such feeds, this type of information might be from unknown or untrusted sources, it might represent legitimate attacks against non-similarly situated networks (which might consequently be of low relevance), it might represent varying thresholds of perceived threat (e.g., the risk might be negligible) or it might otherwise represent a source of "false positives" (i.e., information reported as threats when no threat is truly present). Such sharing mechanisms are therefore also, once again, typically awash in irrelevant information, rendering it difficult for a feed or community subscriber to identify relevant, actionable information. Note in this regard that it is generally very difficult to share information of high-probative value between parties, i.e., the sharing of specific threat information can convey network security strengths and weaknesses, network security response strategies, corn petitively-sensitive information, information restricted by law, or information otherwise detrimental to the network sharing the information; for example, in a common example where a major retailer's consumer database is hacked, the last thing that such a major retailer typically wants is to "informally" publicize information concerning an attack (which if done outside of highly controlled circumstances might increase attack damage, enhance retailer liability or damage retailer reputation). The sharing of high-relevancy information between similarly-situated networks therefore tends to be ad hoc, for example, direct email, messaging or phone exchange between specific individuals with a trusted personal relationship; pursuant to such a relationship, the discretion of the recipient is generally relied upon to sanitize information, which effectively restricts how widely such a practice is used; as a consequence, there is no easy way to quickly, reliably and/or automatically share relevant information across institutions or in manner that can be forwarded.

Techniques are therefore needed for the exchange of network security information between similarly situated networks. Ideally, such techniques would also feature some type of relevancy function, i.e., such that threats can be prioritized based on severity, without requiring network security administrators to manually sift through "false positives." The present invention addresses these needs and provides further, related advantages.

BRIEF DESCRIPTION OF THE DRAWINGS

FIG. 1 shows processes that effectively pool security events (e.g., possible network threats) and that then filter and/or rank those events for relevance.

FIG. 3 is a block diagram relating to provision of a security event pooling service.

FIG. 4A shows a list of a number of exemplary data items that can form a profile or part of a profile used to filter relevant information.

FIG. 4B shows one possible example of a client preferences database, for example, that identifies the client, group memberships, rules to be applied in filtering pooled data.

FIG. 5A shows an example of an automated client portal (ACP) used in one embodiment.

Figure 1:
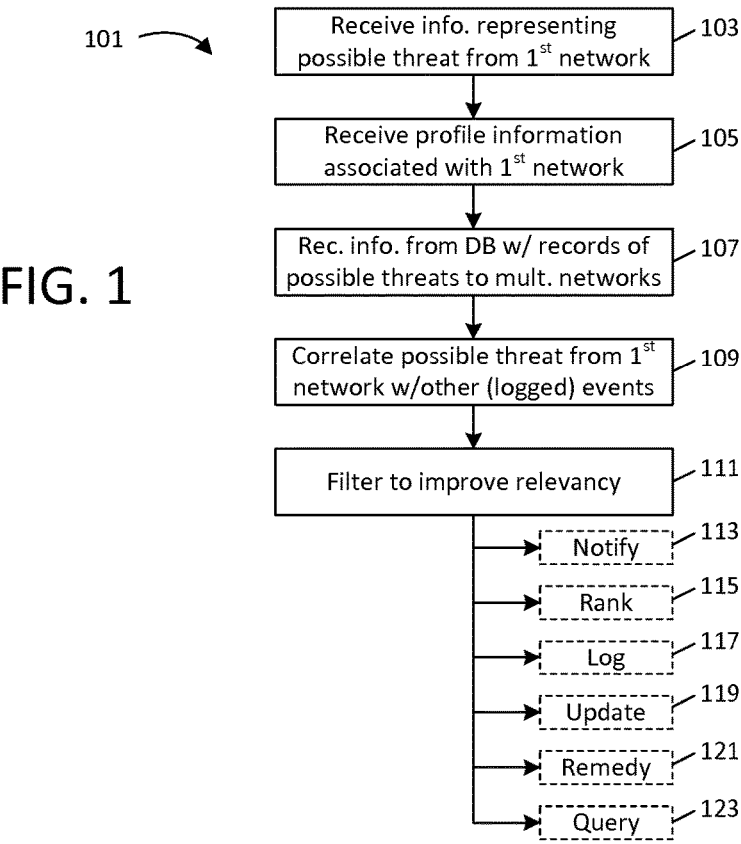
FIG. 1 shows a block diagram relating to one method of performing threat tracking and/or threat assessment for potential network threats; more specifically.

The invention defined by the enumerated claims may be better understood by referring to the following detailed description, which should be read in conjunction with the accompanying drawings. This description of one or more particular embodiments, set out below to enable one to build and use various implementations of the invention or inventions set forth by the claims, is not intended to limit the enumerated claims, but to exemplify their application.

DETAILED DESCRIPTION

I. Introduction.

The description set out below exemplifies techniques systems for pooling and filtering security threat data across multiple, diverse networks. More specifically, embodiments discussed below provide examples of software, a network, a system comprising one or more computers (e.g., servers) and/or other configurations that that collect data from other networks (and/or provide responses to queries from other networks), and use a form of profiling to automatically direct queries or filter queries or results to improve the relevancy of search data; in one embodiment, these techniques can be implemented as a system (e.g., driven by software) that filters a query based on group membership, threat indicators or other information that characterizes or profiles a network, or that filters data retrieved responsive to such a query. For example, such a system can be implemented as a client device (e.g., an automated client portal as discussed below), a central security and/or query routing service, or as a system comprising one or more of these elements. In one embodiment, as a client receives a new security event, it launches a query and/or reports this event. The query or reported event can be directed to a central routing service which, for example, optionally sanitizes the provided information, formulates a sanitized query and/or sanitizes response data, and routes this information to one or more other clients based on profile information (e.g., group membership, stored threat indicators, one or more network characteristics known to the service, etc., hereinafter referred to as a profile or profile information). The central routing service can optionally search a local database (e.g., its own, locally maintained database, using this profile information to filter the query or results for relevancy); the service can also transparently route the query or event to other, similarly-situated networks, as determined using respective profile information. Each other client network that receives the routed information can respond, optionally using an enforced query response architecture (discussed below). The central routing service receives these queries, provides associated ranking information (which can be stored or cached) and responds to the original requestor. Note that many optional variations of such a basic embodiment exist. For example, in one embodiment, a client network can simply report all received security events to the central routing service, which operates "in the cloud;" the routing service maintains its own threat database from different clients and similarly uses profile information associated with each reporting network ("reporter") for an associated event to screen results for relevancy. In another variation, each client system (e.g., an automated client portal or "ACP") can be equipped with APIs to search local security event databases in whatever form event data is stored. Any correlation (e.g., other information potentially related to an attack) can be converted to a common communication format (or "CCF") and transmitted to the central routing service, which can use this information to format a query.

Note that nearly any type of "profile" or "profile information" can be tracked and used to filter searches, query routing or results for relevancy, e.g., in one embodiment, a characteristic used to filter results can be membership in an arbitrary group. That is, for example, a central query routing service and/or aggregator can permit individual clients to form and join "groups" via a dedicated interface (e.g., login) for the particular client. This information can then be used to identify similarly situated networks and to route queries or filter results as appropriate. In other embodiments, a social network can be analyzed and used to infer similarity between one network and another. In yet another embodiment, profile information "associated with a network" can be a threat indicator or pattern of events associated with that network; for example, if a high-risk threat is represented by a specific pattern of attempted accesses that attempt to hack a system, the filtering techniques discussed above can be employed to search the database or format a query directed to a similar pattern of attempted accesses associated with a single target network (or across multiple networks). As should be apparent from this description, relevancy (i.e., one or more characteristics) can be dynamically changed as threat, condition, markets or other factors evolve. The use of "profiles" or "profile information" includes situations where information associated with a network is tracked (for example, a network or client ID, an email address associated with such a network or its administrator, a market identifier, e.g., "Wall Street Bank," a group membership, a pattern of attacks, a specific network type or configuration, or other data) and used to filter a correlation search (or associated results) to improve relevancy. Also, note that the term "threat" or "possible threat" refers to any type of network data, e.g., a single request received over the Internet from a specific domain. The data may not in fact represent a security risk, but is treated as a threat or potential threat from a tracking and analysis standpoint; each given event may turn out to be relevant or not be relevant for purposes of threat analysis.

For some implementations, once a correlation is detected, an action is then taken in response to the detected correlation. For example, in one embodiment, the possible threat (or source of the possible threat) is tracked over time; as another client network reports a new security event, and it is determined that this new event is correlated with other activity in a local or distributed (e.g., multi-client) event database, one or more records associated with such a possible threat are updated (e.g., at a central query routing service or at the querying client). Because of the detected correlation, the threat ranking may rise, and it is desired generally to inform one or more earlier reporters, e.g., other clients, of the (now correlated) threat. In connection with such updates, one or more prior reporters of the possible threat can be automatically alerted to a change in status. In this regard, in one embodiment, the central query routing service in one embodiment stores all threat data and queries reported by various clients, in a secure manner, and in a manner that permits the central routing service to update earlier query requesters associated with a possible threat and/or earlier reporters of correlated security events.

Two examples here would be helpful. In a first example, a first client reports an event representing anew, possible threat; because this threat has not been seen before, it is regarded as low risk. Subsequently, a second client reports a possible threat that is determined to be correlated with the event first reported. In this example, because the common threat is now correlated and upgraded to a higher risk, the service can not only update the ranking of the threat for previously stored data, but it can also notify the first client of the upgraded risk. Note a given threat over time can also change or evolve and present other issues. For example, an attack may be evolved to encompass new techniques (e.g., use of malware); the first client can be notified of this as well. Note that if there are multiple entities which previously reported the event (which now is further upgraded in terms of threat rank or risk), any number of such entities can be alerted as to the change in status (e.g., the first client reporting the threat, the last client which previously reported the threat, any number of prior reporters of the threat, or no one at all). In a variation, similarly-situated clients that have not reported a threat can be alerted as to the likelihood of a threat. For example, the central query routing service can track profile information associated with each client networks (e.g., embodied in two embodiments as simply group membership or a market/ company type identifier, respectively). If a first client (a securities firm) experiences a threat, which is then determined to be correlated with a second client (also a securities firm) reporting a similar event, then one or more other clients sharing a characteristic associated with these networks (e.g., other securities firms) can also be alerted to expect such a threat. As should be apparent, for an embodiment which does not send notifications to entities, the threat can simply be updated; note also that a notifications procedure can also vary depending on the type of threat, dynamically if desired. As an example, in one possible design embodying the techniques provided by this disclosure, a possible threat (e.g., new virus or other form of malware) can simply be tracked and upgraded as to threat severity without informing anyone, or a different group (anti-malware software providers can be notified, e.g., to update their anti-malware offering). Both threat level and response can change if, e.g., it is later determined that the malware is deliberately targeted to certain entities.

Naturally, in one principle embodiment, the party (e.g., network client) currently reporting the threat is immediately alerted in real time responsive to correlation (e.g., so that it can apply security measures in real time).

As alluded to above, one another version of these techniques, a central query routing and/or aggregation service also provides remedial measures to counteract a possible threat which has been determined to be correlated with historical (filtered) data. For example, antimalware (e.g., antivirus) definitions can be updated for the reporting network. Other versions of remedial measures can include (a) providing a template to a security system of the reporting client which then implements the template as an execution operand, i.e., to automatically block a suspicious IP address; (b) storing a database of remedial measures for specific threats used by other clients, and then notifying an entity of remedial measures reported to have been successful against the specific threat (e.g., if multiple remedial measures are provided, these can be further ranked in terms of efficacy); (c) consulting can be offered and/or provided from the aggregating and filtering services provider (or from a third party) as an automatic, triggered response to reporting of the threat by the client in question; (d) further queries can be generated to obtain better accuracy or updated threat status from other clients; or (e) some other type of action can be taken (for example, a specific vulnerability assessment or damage assessment operation can be recommended to the reporting client or another entity which previously reported a similar threat). Many examples of such measures will occur to those skilled in the art.

As should be apparent, the disclosed techniques provide for effect, real-time investigation of pooled resources to detect whether a new security event presents risk or has presented risk across a multitude of diverse, unrelated networks. Consider a hypothetical scenario: nationwide chain store A detects an event representing a possible threat, which is received and used to search a centralized or distributed database, and it is determined that the same possible threat has been seen by nationwide chain store B in the same market (e.g., as determined using profile information for the respective networks, such as common group membership or market conditions, or a threat indicator associated with the respective client networks); responsive to this correlation, a central query routing and/or aggregating service sends a query to nationwide chain store C to determine whether it has also seen the same possible threat. Upon receiving a confirmatory response, the ranking of the possible threat is increased in severity and nationwide chain stores A and/or B are notified that the particular event is correlated with an upgraded threat level.

Note that in examples above, the novel techniques provided by this disclosure can be implemented as a service, e.g., a service bureau entity acting on the Internet with many clients that log and/or report network-security-related events. The service bureau entity provides functions that permit the effective pooling of data, and the searching of that data. As each new event is reported (or on a batched basis), the entity searches a local and/or distributed database and effectively uses profile information to limits the query and/or results to both similar events and reporting entities which are associated with a common set of one or more characteristics; in one embodiment, software and/or structure for performing these tasks may sit entirely on the service entity's network, with or without associated client portals or client-side modules.

In many embodiments, sanitization of information is relied upon to provide client confidence that information will not be shared which reveals client network vulnerabilities or otherwise exposes clients to any of the risks identified earlier. Thus, in one embodiment, each query and/or any provided results are sanitized, to strip some or all information identifying a reporting client, directly or indirectly. For example, in one embodiment, all queries and/or responses are translated to a common, normative communications framework (CCF) and are sanitized to remove identifying information; information such as Internet Protocol (IP) addresses which identify a target or its domain can be removed and/or converted to a format from which source identity cannot be discovered. In one embodiment, these functions are performed by a central query routing and/or aggregating service, as introduced earlier. In another embodiment, these functions can be partially or fully performed on a client portal (e.g., ACP). In still a third embodiment, these functions and associated responsibilities can be shared.

In yet another version, software and/or techniques introduced above can be implemented entirely within an enterprise, or embodied in software for distribution. For example, in one scenario, an entity (e.g., "nationwide chain store A") employs software that receives security feeds from other entities, for example, the department of homeland security ("DHS"), nationwide chain store B and nationwide chain store C. In this scenario, nationwide chain store A receives events tracked by a security event incident management system ("SEIMS"), and it also tracks and logs both its events as well as the mentioned feeds; as each new event occurs, nationwide chain store A searches its logged data (from all sources) for matches; either the search or the results can be filtered, in dependence on a characteristic associated with the various reporting feeds. For example, if only nationwide chain stores A and B accept payment using an Internet payment service provider (e.g., PayPal), and a new attack s associated with such a provider, then either the search'or the results might be limited to only data from nationwide chain stores A and B. Naturally, many examples will occur to those skilled in the art, and many configurations will occur to one skilled in the art, not necessarily limited to one entity or provision of "service bureau" aggregating and filtering functions for clients.

With principles associated with these techniques thus introduced, this disclosure will now provide additional detail regarding a number of specifically contemplated embodiments.

FIG. 1 shows a block diagram 101 associated with one method of providing pooled security event services and relating query/response capabilities. As a first example, the described method might be performed on a service bureau basis over the Internet for a multitude of clients; however, as just stated, this is not required for all embodiments. Per numeral 103, the method receives information (e.g., a security event) representing a possible threat to a first network; this network can be for example a third party client network. Per numeral 105, the method also identifies (i.e., somehow receives) profile information associated with the first network; note that in one embodiment, a central service which practices the method can maintain a client database that has this information, such that it simply looks up this information. Note that this can be done without necessarily identifying the first network; in one scenario, each of multiple clients can use a different encryption key to transmit data and/or queries to the central service, and the service tries each key in its repository until it finds one that permits decryption of the data (this method helps avoid transmitting any identifying information over the Internet); other methods, such as matching a client ID field or an email address with a client database can also be used. In another embodiment, profile information can be transmitted together with a query or reporting of a security event to a central service. Any ensuing searching/querying is represented by numerals 107 and 109, i.e., the central service receives information from a local or distributed database (with individual third party client queries as necessary) associated with threats to diverse entities, and it correlates the threat from the first network with information effectively found from the pooled database. Per numeral 111, either the querying/searching or any returned results are filtered to improve relevancy, to limit results to threats reported by entities having profile information matching at least one characteristic associated with the first network. Once again, profile information can be any type of characterization associated with the first network, including a group membership or a threat indicator associated with activity for that network. By filtering results in this manner, the depicted method improves relevance of stored information by automatically culling that information based on similar security events received by other entities (that are similarly situated).

As referenced earlier, FIG. 1 also shows a number of optional functions representing actions that can be performed by the central routing service. For example, as indicated by numeral 113, a particular entity (e.g., a client network security system, and administrator, etc.), can be notified in response to a successful correlation. Per numeral 115, the possible threat can be ranked for risk severity depending on the correlation and/or the entities reporting earlier, matching security events. For example, in a hypothetical example where fifteen clients of the service operate in the same market, a correlation result that the same security event was seen by all fifteen clients might prompt a higher threat level (i.e., ranking) than if only two of the fifteen entities saw the same activity; alternatively, if only two entities seeing the activity represented 90% of sales volume for a market, such a characteristic can be factored into a ranking as well (e.g., correlation can be weighted according to different factors). Per numeral 117, each new event and/or potential threat can also be logged (e.g., added to a stored database); as referenced by numeral 119, a particular prior threat's ranking can be updated as new data indicates (as a function of later correlation) that the particular threat is more or less severe than previously thought. Per numeral 121, a remedial action can be taken, as introduced earlier; for example, the first network can be sent a security response template that causes an intrusion prevention system (IPS) or intrusion monitoring system (IMS) to automatically block traffic associated with a specific IP address. A further query can also be initiated in response to detected correlation (123), either to one of the same networks that reported the possible threat, or to another location. In one embodiment, the first network is simply informed of a correlation result, for example, a dynamically-determined threat ranking.

Note that if a high-risk issue is detected, under some circumstances, it could be detected as originating from another one of the (known) client networks of the central service; for example, a potential threat can be malware inadvertently installed in a second client network, where the network as a general matter is not associated with improper and/or disruptive activity, and where the vast majority of the second client networks traffic is legitimate and is to remain unimpeded; by correlating characteristics associated with different event reporters (e.g., different client networks), as part of profile information, it becomes relatively straightforward to act both dynamically and appropriately in response to a detected threat. In the malware example just referenced, the appropriate response might be to take no action at all, or it might be to send a message to a security administrator for the first (or second) client network to automatically install a security template that will result in filtering the malware in question. Clearly, many examples are possible.

Figure 2:
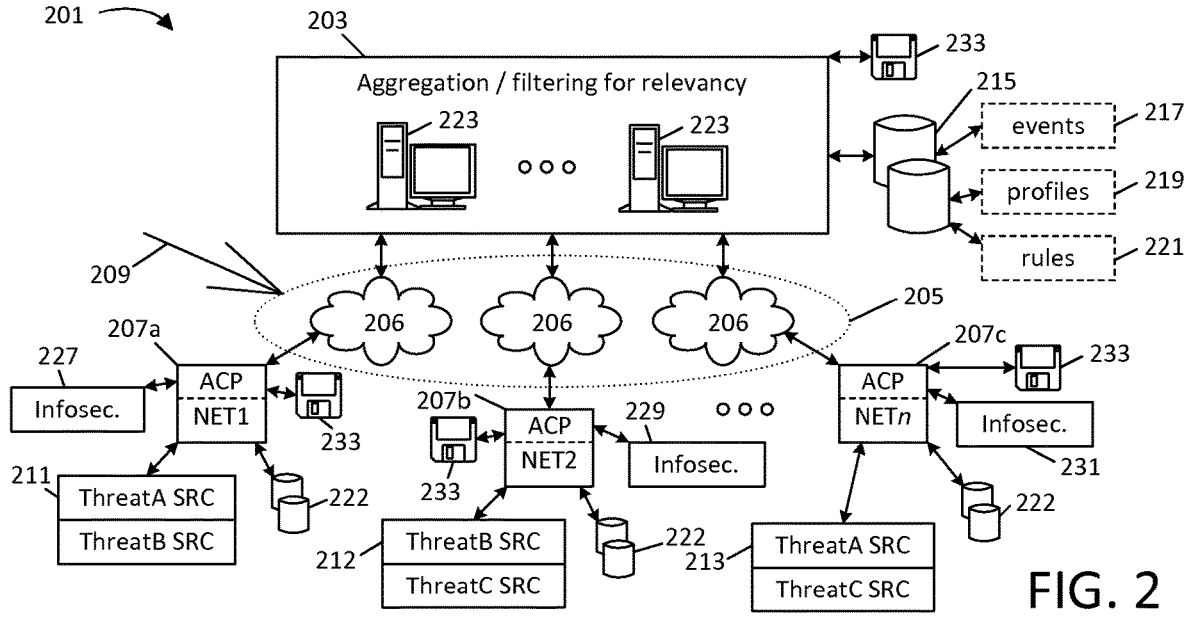
FIG. 2 is an illustrative diagram relating to providing a security event pooling service, e.g., for multiple clients.

FIG. 2 shows an illustrative diagram 201 that features an example configuration for central query routing and/or aggregating service, represented by box 203. More specifically, this service is seen to be connected to a wide area network (WAN) 205, in this case the Internet, and in turn to have a number of clients represented by networks "NET1," "NET2" . . . "NETn." For example, each of these networks can be a public or private enterprise which pays a subscription fee to the central service 203 in order to receive access to pooled resources and receive immediate feedback on security events affecting the specific network, business sector, affiliated group, and so forth. It is not necessary that each client be connected to the same network 205, and to this effect each client can be connected to one of networks 206 which can each optionally be a WAN, a local area network (LAN) or another separated network connection. Each client network in this example is seen to have local software, represented by an automated client portal (ACP) 207a-207c to facilitate interaction with the central service 203. For example, instead of filtering and interpreting security event data, the particular client network optionally has its ACP configured to automatically forward all logged event data directly to the central service 203, which operates as a cloud service. Alternatively, each ACP 207a-207c can be configured to instead or in addition locally log event data and to search its own database(s) prior to or in instead of reporting information or sending a query to the central service 203. In one embodiment, an ACP 207a,b or c can query its own databases and query the central service 203 only if correlation is locally first detected in databases maintained by that ACP, with a query to the central service 203 being a triggered result of such correlation. Again, main variations are possible. Each ACP 207a-207c can be further automated (e.g., controlled by software) to send queries to, service queries from, and send or receive security event data and/or query response data from the central service according to a normalized, common communications framework (CCF). Such a scheme can also involve using predetermined message types that optionally provide messages, queries, templates (automated configurations), or other types of information, according to a defined framework (for example, as disclosed by the aforementioned patent applications which have been incorporated herein by reference). Each ACP 207a-207c can be structured so as to include all necessarily application program interfaces (APIs) to provide translation as necessary for machines and/or administrators operating in the environment of the particular network (NET1-NETn) and any common security system communication format or data storage format (e.g., archived "Splunk" or "Hive" data, as discussed below). Such messaging format, query and related capabilities will be discussed further below. Note that the machines/administrators responsible for providing network security for the respective network are represented by an information security box ("infosec"), labeled 227, 229 and 231 for the respective network (NET1-NETn).

It should be assumed that one or more of the depicted networks (NET1-NETn) will at some point come under attack from an unknown source, represented by numeral 209 in FIG. 2, and further, that information is available that would enable realtime identification of this attack, but is "buried" amidst a vast amount of information logged by the target network. For example, network NET1 might experience a first set of security events 211 (labeled "ThreatA SRC" and "ThreatB SRC") but be unaware that this data represents a risk to its networks. As a separate matter, network NET2 might experience a second set of security events 212 (labeled "ThreatB SRC" and "ThreatC SRC"), and network NETn might experience yet another set of security events 213 (labeled "ThreatA SRC" and "ThreatC SRC"); it is assumed that these events 211, 212 and 213 represent risks to these networks (e.g., malware, viruses, spam, directed attacks, and so forth, of varying severity) but that these events are very small subsets of the total event base received and/or logged for each network. The central service 203 in one embodiment receives the entire event base for each network and records these in a database 215, together with information representing the originating network. In a second embodiment, this does not necessarily happen (e.g., the received event data is locally logged by each network), but the central service 203 provides a framework for effectively pooling the data received by all of the networks (NET1-NETn), and permits both searching of and relevancy filtering of the pooled data. Note again that for purposes of privacy and client security, in many implementations, the information as reported and/or as indicated by a query or query response can be sanitized so as to not identify the reporting network, or to identify the reporting network using an identity code or in some other manner. To provide one non-limiting example, in one embodiment, as mentioned, each client can be represented solely by a shared secret key unique to that client, with all security event data being uploaded to the cloud and stored in encrypted form; a group membership is represented simply by a list of shared keys for all members of the particular group. When a new event is reported by a group member, all of the keys available to the service are tried and used to identify one or more groups having a key used to encrypt the new event; other keys associated with the same group are accessed and used to identify matching items logged in the database, and/or compared to a hash or other identifier; in this manner, or using a similar procedure, a small subset of events in the database, filtered according to profile information (e.g., a group membership) can searched for correlation. As should be apparent, this process represents one possible, computationally-intensive procedure for pooling and filtering already-sanitized data, and it is provided simply to illustrate one of many examples as to how security and sanitization can be applied in concert with the techniques disclosed herein. In the illustrated manner, the information reported by each network remains secret, with even the aggregating and reporting service being unable to identify which client reported specific information. Many other examples will occur to those skilled in the art for providing various levels of security/sanitization, versus benefits gained by limited or unlimited use of client identity.

Returning to FIG. 2, note that the central service can store not only events 217 in one or more databases, but further can optionally store profile information for each client (219) and optionally, rules for each client (221). Similar databases (222) can also be used by each client, with some or all of this information. For example, there can be one or more sets of rules defining when that client wants to receive notifications, how event data should be reported, whether the client accepts automated threat response templates, how messages should be configured, whether third parties should be notified, group membership trust levels, whether outgoing or incoming information should be sanitized, any network configuration information for the particular client, and so forth. In one embodiment, the ACP 207a-207c for each of the depicted networks provides a secure administrator interface to locally (or centrally) define these rules, change group memberships and/or trust levels, launch manual queries of the event database (217) and so forth. Note that the central service can be formed to have one or more servers or other computers or network equipment 223, for example, including web servers, proxies, routers, machines dedicated to security functions, mass storage devices, data centers, and so forth, at a single facility or at remote physical locations, and further, that these machines can run instructions stored on non-transitory machine-readable media (i.e., software), 233, to implement the various described functions. Such instructions are written or designed in a manner that has certain structure (architectural features) such that, when they are ultimately executed, they cause the one or more general purpose machines (e.g., a server, processor, computer, etc.) to behave as a special purpose machine, having structure that necessarily performs described tasks on input operands to take actions or otherwise produce outputs. "Non-transitory machine-readable media" means any tangible (i.e., physical) storage medium, irrespective of how data on that medium is stored, including without limitation, random access memory, hard disk memory, optical memory, a floppy disk or CD, server storage, volatile memory and other tangible mechanisms where instructions may subsequently be retrieved by a machine. The machine-readable media can be in stand-alone form (e.g., a program disk) or embodied as part of a larger mechanism, for example, a laptop computer, portable device, server, network, printer, or other set of one or more devices. The instructions can be implemented in different formats, for example, as metadata that when called is effective to invoke a certain action, as Java code or scripting, as code written in a specific programming language (e.g., as C++ code), as a processor-specific instruction set, or in some other form; the instructions can also be executed by the same processor or different processors, depending on embodiment. Throughout this disclosure, various processes will be described, any of which can generally be implemented as instructions stored on non-transitory machine-readable media. Depending on product design, such products can be fabricated to be in saleable form, or as a preparatory step for other printing, curing, manufacturing or other processing steps, that will ultimately create finished products for sale, distribution, exportation or importation.

To provide an operational example, it should be assumed for the moment (1) that networks NET1 and NETn are in a common first industry, that network NET2 is in a different second industry (and consequently may experience different forms of attack or network risk) and (2) that commonly labeled security events (e.g., "ThreatA SRC") represent a common attack or issue; further, it should be assumed for the moment that (3) the central service 203 compares a single characteristic of "industry membership" for these networks for purposes of filtering security events (e.g., network NET1 can in one embodiment be unaware that network NETn is also a client of the central service). Naturally, many different types of network-matching characteristics can be used, and more than one characteristic can be used for querying and/or results filtering, and any type of logic (e.g., including complex Boolean logic) can be applied to these ends; if desired, the filtering applied for any one client can be made administrator-selective, for example, by appropriate configuration of optional rules (e.g., stored as 221 or part of a client ACP database 222). In a "cloud repository" scenario, if networks NET1 and NET2 have already reported data including the depicted threats 211 and 212 to the central service 203, and network NETn subsequently experiences its depicted events 213, the central service 203 could be configure to receive a report of these events 213 and to automatically identify that network NET1 is part of the same industry as NETn; the central service 203 could then automatically identify that network NET1 had also experienced "ThreatA SRC," and it could upgrade a ranking (i.e., threat level) associated with this event. Depending on any default notifications or rules established for each network, the central service can notify network NET1, network NETn, or both, as to the severity of the threat. It is noted that network NET2 and network NETn also experience a common threat "ThreatC SRC," but in this example, network NETn is not notified of this as in this simple example networks NET2 and NETn are in different industries and are presumed to be differently situated. In a distributed event storage model, network NETn might decide launch a query to the central service 203 related to a new event (e.g., optionally after locally identifying that a new event is correlated with other activity and represents risk) and the central service might query a central repository and/or query other client networks, with either the query or returned data filtered for relevance; the same type of ranking or other action can similarly be performed in this event. As should be apparent, the actions taken can be far more complex in practice than these simple examples indicate; for example, many different groups, characteristics, rules and procedures can be applied and these can be dynamically changed (either automatically or via administrator participation), and in another embodiment, network NETn might want to be notified of the common threat ("ThreatC SRC") to network NET2, or alternatively, it might want to be notified if both networks NET1 and NET2 experience the same security event (e.g., "ThreatB SRC").

FIG. 3 provides another flowchart relating to a method 301 of pooling security event information from respective, diverse networks and filtering that information for relevance. There are one or more networks that report security related events, "NET1"-"NETn." As indicated earlier, an logging or searching service can be optionally integrated with one or more of these networks, as indicated by a dashed-line network designation 302. Each network optionally has a respective automated client portal "ACP" (303a-303c) for interacting with an information pooling and filtering service, though this is not required for all embodiments. The information pooling and filtering service can also optionally receive any other type of information, for example, RSS feeds, email reports (e.g., from DHS or another entity) and other information, per numeral 305.

As with the embodiments described earlier, the pooling function logs events reported from multiple, diverse sources, per numeral 307. These networks can include any one or more of the depicted information sources, for example, a single RSS feed from a public source, as long as information regarding diverse networks is conveyed to/known or otherwise used to filter in dependence on at least one common characteristic that represents known or network profile information. In one embodiment, as noted earlier, the method is performed on a service bureau basis for many respective, diverse networks 303a-c, and potentially including other networks reporting indirectly through an RSS feed or other informational source 305. As data is gathered, it is logged. Optionally, according to a CCF, this data can be centrally reported to and stored in the cloud. As a new event comes in, per numeral 308, it is checked against a local or distributed database 317 (and/or client networks NET1-NETn) and used, to detect correlation between security events reported by similarly-situated entities. That is, as indicated by functions 307 and 309, queries and/or any result matches are filtered for relevance in this manner and used to better filter any matching information to events most likely of interest to one or more subscribing client networks (NET1-NETn). If a correlation is detected, then in this embodiment, rank of the detected threat is upgraded (311); nearly any type of score or indicator can be used to express threat severity (e.g., H/M/L for high, medium low, a numerical score such as 0-99, or some other type of indicator). Also nearly any desired function can be used to appropriately weight and/or score threats, for example, based on the number of filtered "hits," based on a number or type of characteristics a prior reporter of a "hit" has in common a group or an entity reporting a new threat, based on other threat indicators (e.g., other threats originating from the same domain), or based on some other type of function. In one embodiment, this updated rank is stored for future use and, in a different embodiment, it is used only to gauge responsive action to be taken including whether to notify any particular entity (e.g., the rank can be dynamically recomputed anew with each correlated newly-reported event). In one embodiment, ranking can event be made client specific (e.g., according to client-specified rules 321). If a notification is to be sent to any particular entity (e.g., per numeral 315), in one embodiment, sanitization can be provided at this point in order to protect client anonymity. For example, information that a particular entity has been hacked, is under attack, is collaborating (via the pooling service) in a shared defense scheme, has lost data, has responded a certain way and so forth could (without some form of sanitization) provide information to third parties in a manner that is undesired. In one embodiment, therefore, any notification is filtered so as to redact any mechanism for target attribution (e.g., by masking IP addresses and/or domains associated with any one or more client networks NET1-NETn). In other embodiments, the information can be instead sanitized by each ACP (303a-c) prior to reporting events to the aggregating and filtering service. In another embodiment, responsibility for sanitization can be distributed (e.g., shared) or can be made dependent on client specific rules (for example, as specified by a network administrator, operating via a dedicated management portal, as alluded to earlier).

FIG. 3 also shows some of the various options introduced earlier. For example, per numeral 320, administrators for each client network (NET1-NETn) are optionally each provided with respective credentials to log in and perform configurations specific to the particular network (e.g., either by direct interaction with the networks' local software, e.g., via an ACP, or by configuring client-specific parameters used by a central service). As indicated by numeral 319, these administrators can adjust network specific profiles or related preferences including any group memberships. For example, in one embodiment, each client's ACP provides a portal for each administrator to send messages and/or establish a social structure (e.g., a chat or messaging framework) with other network administrators in the same general industry (e.g., via either a set of direct contacts, or a communications network and/or contact/group formation capability provided by a central service, e.g., as represented by numeral 219 in FIG, 2). Such a structure, or a deliberately defined ad hoc group, can be used as the basis for filtering, as described earlier. Alternatively, the administrator can be presented with a set of questions to respond to describing the client network, the answers of which can be used to build profile information, for example, by specifying things like company type, company identity, network type, types of machines, types of traffic, past threats, types of websites offers, security configuration, business segments, whether online payment or online commerce is supported, and many other types of information. Using such a control plane, each administrator can optionally also define rules (321) used to rank threats for the particular client, rules (323) for sanitization/information sharing, notification preferences or a set of remedial measures or scheme for applying remedial measures (variously numbered 325, 327, 329, 331, 333 in FIG. 3). These various options are collectively represented at the bottom of FIG.3, For example, in one embodiment, a notification can be sent to the network that first reported the threat, per numeral 325; that is, as noted earlier, a particular security event may later become correlated with other events and have an increased threat ranking; depending on the type of threat and the upgraded ranking for that threat, a party may wish to be notified of the assessment of increased risk, e.g., so that it can take remedial measures, assess possible theft or damage, or run a vulnerability assessment. Conversely, it may also be desired to notify the last reporter of a threat (327), or any prior set of prior reporters (329); such a set can in one embodiment be selected based on respective profile information (i.e., where notification selection can be predicated on characteristics or modifiers different than those used to filter event search results). A group can also be notified and/or one or more group members that have not yet seen the particular security event can be notified, per numeral 331.

A notification can also include transmission of a remedial measure to an entity receiving a notification message. For example, in one embodiment, a database 335 maintained by a central query routing and/or aggregating service (either the same as database 317 or a different database) can store one or more measures adapted for use in defeating a correlated threat. If desired, the stored measures can be measures that have been reported to be (or proven to be) successful against the particular threat, for example, measures tried by other clients with success. In one embodiment, the query functionality provided below permits each client network ACP to selectively or automatically specify a threat and initiate a query seeking template responses to the threat; such a query can be routed to a filtered or selected set of contacts using profiling (including group membership) as described earlier. If multiple measures are discovered to be useful in defeating a specific threat, the notification message can include a ranking of different remedial measures in terms of their efficacy (and the query functionality can be used to establish this relative efficacy as well). A notification message can also include consulting advice or a link to obtain consulting advice (337), for example, with a security services professional; as this option implies, if services are provided to clients without their own in-house network security personnel, such a link can be used to connect a consultant (e.g., employed by the central service) with the affected network, to provide for remote network security support. If desired, instead of a message that conveys a link, the notification can itself consist of a security consultant (e.g., one that works for or on behalf of the aggregating and filtering service) being prompted to contact the affected network, to thereby verbally (or in writing) inform the affected network of the threat in question. Finally, per numeral 339, in some embodiments, one or more templates can be stored, queried or dynamically compiled, and sent to a client to address the specific threat in question. For example, if a client uses a security system (e.g., an intrusion prevention system or "IPS") that can act on a template provided as an operand, the notification can consist of automatic sending of the template to the affected network, i.e., for use as an executable/operand that causes the security system (e.g., IPS) to implement a new security configuration specified by the template; such a hypothetical template might include a request for the IPS to block messages from a particular IP address, or address range, or firewall, and so forth. Many other examples are possible. Notably, the patent applications referenced earlier (which have been incorporated by reference) provide detailed discussion of use of templates and automated configuration of virtual machines to implement preconfigured or dynamically configured security processes.

It was earlier mentioned that filtering can be performed according to any desired characteristic associated with a network. FIG. 4A gives some examples of some characteristics that can be used. The list 401 depicted in FIG. 4A is meant to be illustrative, not limiting in nature. For example, each client network can be associated with one or more market IDs or classifications, per numeral 403, with codes (and any desired subcodes or fields) as deemed appropriate. For example, a hypothetical code might identify a particular network as belonging to a company type of "bank," while a subcode might indicate that the bank in question is specifically a "high-value investor private banking service." Multiple such codes or fields can be associated with an entity, for example, a given enterprise might both be classified as a "company that makes microprocessors" and for "a company that sells electronic equipment to the US government" with associated membership in any given category being non-mutually-exclusive to other categories. In other embodiments, codes or identifiers can be mutually-exclusive or configured in some other manner. Per numeral 405, it is also possible to characterize a client network by demographics. To provide some examples of this, corporate address, site address, whether the company operates a secure website, number of employees, financial rating, country of incorporation, and many other types of information can be used. In another embodiment, per numeral 407, the characteristic can be a series of security events or other specific threat indicators, e.g., indicators that might reveal that a network newly reporting an event or threat is likely to be subject to a future event or attack, as determined from patterns seen against other networks. Returning briefly to FIG. 2, as an example of this latter point, if it is determined (e.g., by update of a threat ranking) that a network seeing both threats "ThreatA SRC" and "ThreatB SRC" is likely to be subject to further attacks (e.g., "ThreatD SRC", not depicted in FIG. 2), then should network "NETn" subsequently see "ThreatB SRC," a central service might dynamically group network NETn with network NET1, depending on the threat indicator represented in FIG. 4A by numeral 407. Per numeral 409, group memberships can also be relied upon in order to filter searches; for example, in one embodiment, the central service uses this information in preparing and/or routing queries. In another embodiment, such a service can also provide bulletin boards, chat mechanisms, online forums, or other mechanisms restricted to group members or open to the client base at large or the public. When a threat is detected, any desired subset of group members can receive a notification, filtered if desired for the preferences of the specific network (e.g., some clients might not want to receive certain notifications and can configure their rules to this effect). As indicated by numeral 411, in one embodiment, an administrator's (or company's) social networks might be mined and used to automatically infer group membership, for example, based on job title, domain, contact lists, and any other desired factor. Per numeral 413, a company's network configuration can be stored and used as a characteristic by which to group clients; for example, the type of firewall, the type of proxy configuration, the available network security software and/or hardware and other types of network particulars can be used as a characteristic to help filter relevance. As should be apparent, other information can also be used (415), and any of the mentioned, exemplary characteristics can be used alone or in combination with one another, with any desired weighting or filtering criteria. Generally speaking, each identified piece of information represents a characteristic associated with a network, and thus helps profile that network.

FIG. 4B shows an illustrative example of one embodiment a client preferences database 451, that is, a part of a database that can be used to identify and/or profile a client. For example, a client subscribing to a security event pooling and filtering service might register for the service and arrange for a control plane interface used to define parameters of service (e.g., any of the "rules" mentioned in connection with FIG. 3). In one embodiment, client preferences can be stored at a central service (e.g., query routing service); in another embodiment, preferences can be locally stored (for example, via a client ACP). Such a registering client might provide billing information, corporate identity, and might be assigned a client identifier code (represented by numeral 453 in FIG. 4B). Any type of information can be used to identify a client, for example, an email address (e.g., and administrator email address, a domain name, an IP address, or similar information), as denoted by numeral 455. Per numeral 457, a client database might store a set of rules or preferences, for example, any rules or other information selectively established via path 320 from FIG. 3. Each client, via a secure interface (e.g., via the ACP or via a dedicated web portal) can associate its network with one or more groups, per numeral 459; again, in one embodiment, group membership can be used to identify presumptively similarly-situated networks, and to route or filter queries (463) and/or response data according to this profile information. Such information can also be used to index a separate database (e.g., a relational database), per numeral 461, where group lists are stored in order to retrieve group particulars. As indicated by numeral 465, in one embodiment, each client can supply other information regarding the configuration of its network, such as types of network security equipment, network size, and so forth. This configuration information can be used to select particular APIs, for example, to configure each ACP so as to perform local searching and/or interact with local client-specific network security equipment and/or software. A client can also have associated with it one or more market IDs 467, billing information 469 or other types of information 471. In one embodiment, a central query service and/or cloud service uses these types of information (or any subset of them) in order to link reported events to any particular client or other source, to send notifications or take remedial measure, to perform billing, or to provide other functions or services.

Figure 5A:
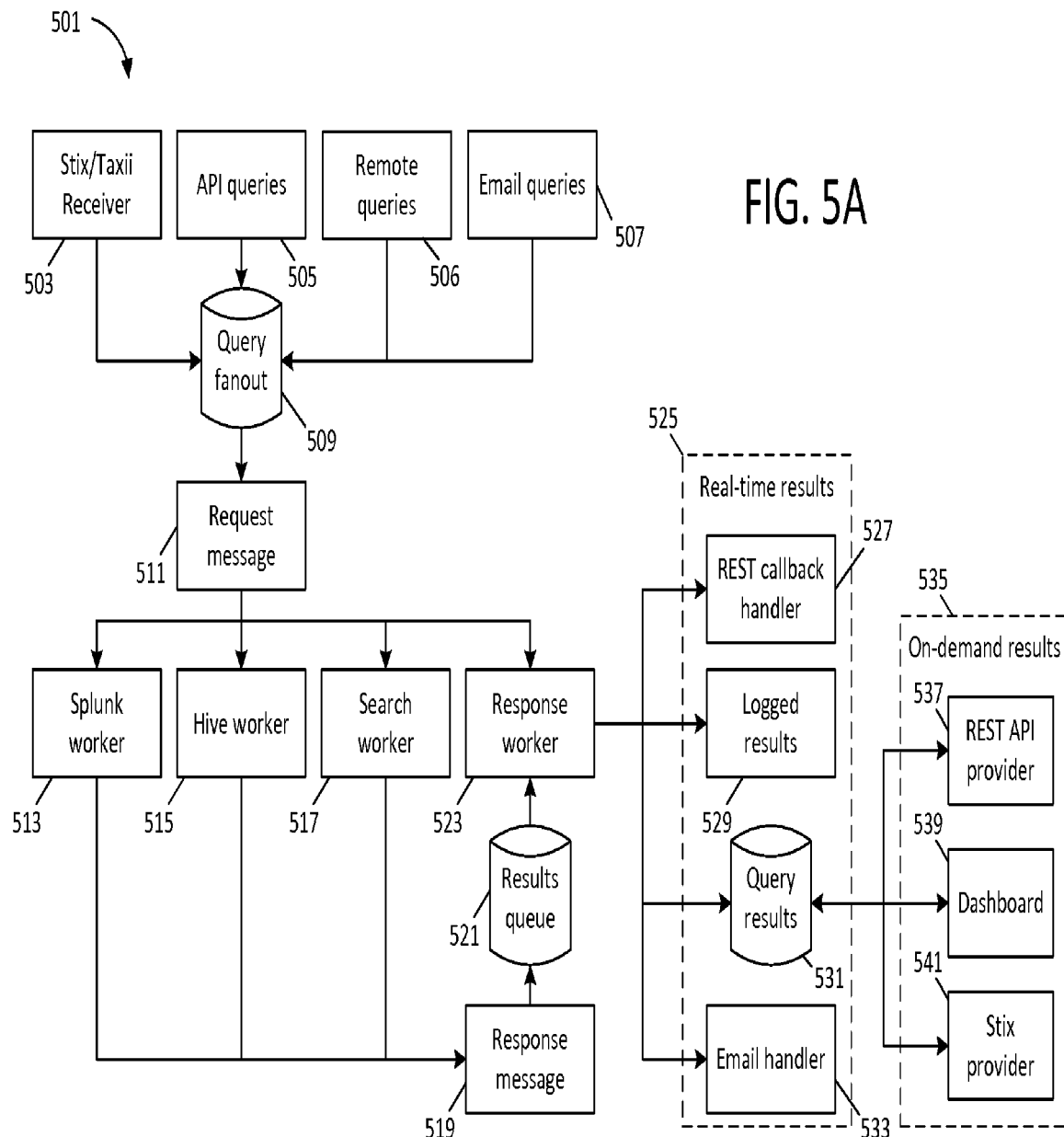
FIG. 5A shows layout of one example of a system used for provision of security event pooling services; more specifically.

FIG. 5A shows a block diagram associated with one implementation 501 of an automated client portal (ACP); the same architecture can optionally be used for each client as well as a centralized query service, or respective, different architectures can be used. As was introduced earlier, the system represented by FIG. 5A can be partially or entirely implemented as software, i.e., as instructions stored on non-transitory machine-readable media that, when executed, configure one or more machines (e.g. computers) to act as special purpose machines with circuitry that necessarily responds in a constrained manner (defined by the software and its associated functions). Note that both of these things represent "logic," i.e., software is a form of instructional logic, which the machines and their circuits represent a form of hardware logic.

It should be assumed that a typical ACP is configured to interact with a potentially unknown and potentially large set of diverse internal security systems resources. As such, security event data might be stored in many different manners within a client's network. Note that FIG. 5A represents a ACP that is optionally configured both to search locally for event matches, as well as to interact with a central query service as described earlier, as well as to respond to queries sent to the client from such a service. The ACP can interact with multiple networks (e.g., if implemented by a central service as described) and can forward queries and/or data using the communications scheme discussed further below. As seen in FIG. 5A, the depicted ACP includes software modules that implement four basic types of parsers or receivers including (a) a STIX/TAXII receiver 503, (b) API queries from various other sources (e.g., non-STIX/TAXII compliant systems), (c) a remote query receiver 506, and (d) email queries 507, for example, initiated by a system or from a human administrator for the client. The function of each receiver is to extract/translate information representing a new event (e.g., and associated local query, or a query from a remote source) into an accepted communication type, for example, using a normalized query structure (and/or a normalized data exchange scheme pursuant to the CCF discussed below). As a new security event is detected, or in response to an external query, the ACP then searches local client security system databases and generates a result. In the case of the central service, the system can be further designed to have instructional and/or hardware logic that forwards queries to other networks, for example, in association with group data or other network profile information stored local to the central service. A query fanout function 509 converts a received query to a format usable and understood by any local, diverse data management systems and then farms this query out to different (parallel) workers 513, 515 and 517 that provide APIs to these systems. That is, a "typical" large enterprise might have diverse databases that store event data as Hadoop data or in another format, structured or unstructured. Workers 513, 515 and 517 represent the various APIs necessary to interface with client security systems and associated databases. For example, as indicated by numeral 513, one of these workers can utilize software available from Splunk for searching associated database data. As indicated by numeral 515, Apache Hive software can also be used (e.g., to search Hadoop data). Per numeral 517, any other type of worker can also be used in parallel, running on the same machine as the other search workers (e.g., as a virtual machine) or a different machine; for example, depending on environment, APIs may be implemented to interact with IBM's "Secure Radar," HP's "ArcSite" format, RSA's "Security Analytics," and so forth. Such API's can be custom to the specific client, according to the specific security systems it implements, or can be provided as part of a set of stock modules that provide ready APIs adaptable to any number of different, known systems or formats. As indicated by numeral 519, as each query is completed, it results in a response message 519 transmitted between software modules. Each response message 519 is stored in a queue (521) for processing by the response worker 523; the function of the response worker is to respond as appropriate when queries are deemed complete (i.e., when they resolve or when a predetermined time has elapsed). Note that in the case of a central service, the response worker 519 and the results queue 521 can be used to monitor outstanding queries to other client networks, and to provide a unitary response to a requesting client. Note that a structured query format will be discussed below with enforced response times; if a first type of query is received (calling for a real-time response), the response worker responds within a specified deadline (e.g., 1 minute); if a second type of query is received (e.g., calling for lower priority asynchronous response, e.g., whenever searching is complete), the response worker responds only once all parallel queries are resolved. Alternatively, the system can be configured to provide both real-time response as well as asynchronous response (e.g., once an outstanding query has returned with some type of result). A function of the response worker 523 is to collate the various responses, such that (as appropriate) a single response message or expected response format is provided irrespective of the number of workers employed.

Box 525 represents a set of real-time results (e.g., results obtained responsive to a local search within a period of time, e.g., 1 minute, or per other time period). First, per numeral 527, a REST callback handler can be employed to provide automated query response. Alternatively or in addition, an email handler 533 can be employed to respond to queries (optionally if an incoming remote query was received by email), or to direct further, external queries or notifications.

Again, the format of response can be configured by pertinent client rules. Pertinent query results can then be logged 529 and made available responsive to the initiated query, per numeral 531. These results can then be displayed and/or sent out automatically or on-demand, per dashed-line box 535. For example, a REST API provider 537 or STIX provider 541 can be used to transmit outbound query results (e.g., to a central aggregator or query function). Results can also be locally displayed on a client dashboard, per numeral 539.

Figure 5B:
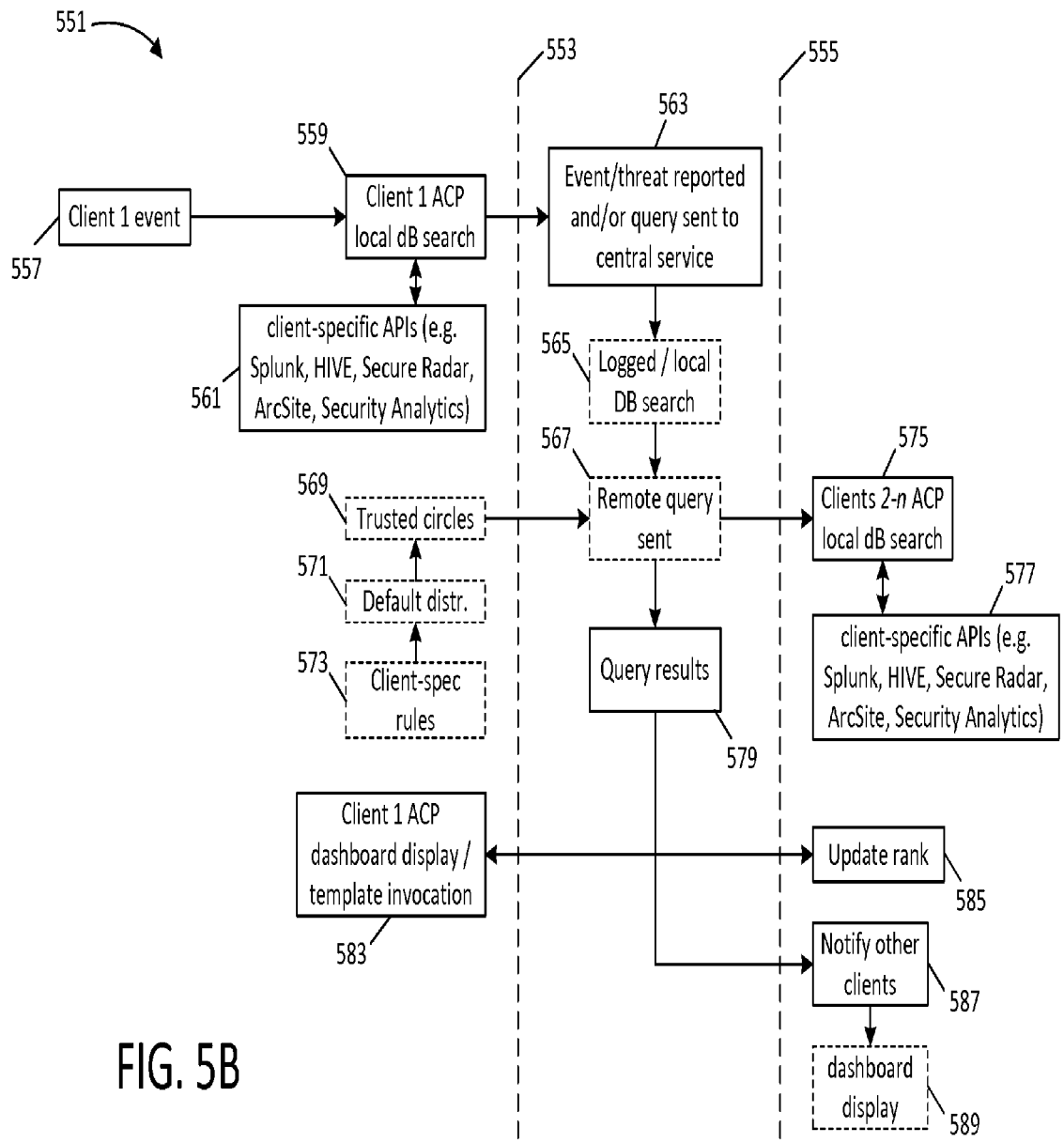
FIG. 5B is a flow diagram showing how the ACP from FIG. 5A might interact with a centralized query service and/or other client ACPs, through what is (indirectly) a peer-to-peer architecture.

FIG. 5B provides another flow diagram 551 that depicts a typical interaction with a central service using the ACP structure just described. Note again that one embodiment of the techniques provided by this disclosure provides an ACP run on a single client (e.g., software on machine-readable media or a machine, collection of machines or system configured for specific operation). Another embodiment provides for a central service run with or without such client software, e.g., this central service can also be represented by software on machine-readable media, as a machine or collection of machines or system. In FIG. 5B, two vertical, dashed lines 553 and 555 denote network boundaries between (a) a first client network, represented by functions seen to the left of vertical dashed-line 553, (b) a central service, represented by functions seen in between vertical, dashed lines 553 and 555, and (c) third party networks, represented by functions seen to the right of vertical, dashed line 555.

Specifically, it is assumed that the first network detects a security event, per box 557. Client software on this first network (e.g., a client ACP) is optionally configured to search a local database, as indicated by block 559. Such a search can use the various parsers or APIs described above in connection with FIG. 5A to perform any desired interface or translation with existing client network equipment or data formats. As indicated by box 561, these APIs can include handlers for Splunk, HIVE, Secure Radar, ArcSite and Security Analytics systems available from respective systems providers. Note that as indicated earlier, this is not required for all embodiments, e.g., the first network can be configured to report all events "to the cloud" (e.g., to the central service). The first network can also be configured to send a query related to the received security event, either immediately, or upon a desired condition (e.g., correlation with data in one of the systems represented by box 561).

The query from the first network and/or events reported to the cloud are sent to the central service, per numeral 563. This service optionally logs this event (e.g., as part of a cloud storage service) and either in response to the event or a query optionally searches a local database, per numeral 565. If desired, the central service also optionally routes the query (567) to one or more third party networks (e.g., networks optionally selected based on one or more characteristics (or profile information) in common with similar characteristics (or profile information) of the first network). In the case where the first network simply reports an event to the central service, the central service can generate such a query sua sponte. Note that group membership can be used to route and or direct any query or filter data, i.e., as a type of profile parameter.

FIG. 5B indicates that query processing or forwarding can be automatic, can be responsive to specific threat levels or trust levels, or can be determined in whole or part according to client-provided rules (e.g., stored as part of each client's profile with the central service). For example, as indicated by dashed line-box 569, a set of trusted circles can in one embodiment be established by each client for use with different groups or threat levels; as an example, for any "group" selected by a client (i.e., formed or joined by a client), the client can identify a trust level or default sharing policy with the specified group. In one embodiment, each group (or other profile characteristic) can have "red," "green," "yellow" or "white" trust levels. A "red" group can imply automated sharing of queries and/or response data with every other member of the group (or other client sharing the same characteristic, depending on how queries and/or events are routed for the specific embodiment). The other color levels have different associated characteristics, for example, requiring human intervention (e.g., a "click") before a query is sent from a network or before data is responsively provided in response to a query; for this type of process, multiple queries and/or responses can be queued before being sent out (e.g., until approval is received). Message or data format can also be varied depending on trusted circle level, for example, responding to just a single query requester, or to all group members. These various principles indicate that in one embodiment, each client (including the first network) can set default distribution rules per numeral 571, or can specify client-specific rules, per numeral 573. Thus, to send out a query, an administrator for the first network might select a "channel" (or group or profile characteristic) to provide for query and/or event routing in a manner associated with a client specific distribution (e.g., trusted circle). The central service receives the query and/or data and distributes the query data to the specified circle, applying sanitization to mask identity of the first network; the first network also does not necessarily know the identity of other group members (and this may vary depending on channel or a client-specified distribution characteristic). The central service locally searches and/or optionally routes the query as indicated by numerals 565 and 567. Other clients, as appropriate, receive a query or event which has been sent out and search their own local databases, per numerals 575 and 577. The central service receives query results per numeral 579 and responds as appropriate (or takes other action), if desired, dependent on client-specified policies or rules. For example, the first network can be notified of query results, e.g., in the form of a summary or other data; in one embodiment, query results represent respective, diverse networks (filtered as appropriate) and the first network is informed of the number of "hits," a ranked threat level provided by the central service, and a comparison with any local search results. Other information can also be provided (e.g., a suggested remedial measure) or this can be provided responsive to separate query. Results can be displayed to an administrator per a dashboard function for the first network (e.g., via an ACP) or a template or other remedial measure can automatically be applied, per numeral 583. Other actions that can be taken, per numerals 585 and 587 include updated a stored rank and notifying other clients of any updated threat level (585) or notifying other clients of query results or the results of correlation or detected threat (587). For other clients that utilize an ACP as has been described above, results can optionally be displayed via their respective ACPs' dashboards (589).

With software and related systems for pooling information repositories and/or propagating events and queries thus described, this disclosure will now discuss communication formats, data sanitization and normalization, enforced query response and exemplary client configurations.

One embodiment of the techniques presented herein provides for communication between network security machines and products, potentially across dissimilar networks. Information regarding security events is processed to create templates or data records in a manner representing a common communication framework (CCF), e.g., using application program interfaces (APIs) that interact with vendor-specific products. In a variation of this embodiment, a caching protocol can be used which guarantees immediate return of "best available information" for certain types of queries (or automated response) with enforced response time, or that alternatively provides an asynchronous response (e.g., an automated response as soon as information is available) depending on type of query (or other trigger). These techniques also provide for a framework for normalizing and sharing data for purposes of improving security. This framework can optionally use the CCF or caching/enforced query structure just described (or a different scheme). Information is received for different security events (e.g., threats detected from specific files, specific locations or sources on the Internet and threats that are otherwise of concern from a security standpoint) and is exchanged (e.g., with a cloud service) or maintained in a repository in a form that can be readily queried by one or more networks or network security providers. In one contemplated implementation, this framework is established and managed by a security services provider as a subscription- or other fee-based (e.g., cloud-based) service for its clients. Such a services provider can structure its services to provide cross-client alerts or reporting of common threats (or potential threats), as mentioned above, all without revealing sensitive client information or vulnerabilities.

Still further, this disclosure provides a framework for building a custom security network and/or hosting such a network for third parties. Such network can optionally be designed using a virtual machine (VM) architecture that permits cross-vendor or cross-product interaction and scalability, notwithstanding native dissimilarities or incompatibilities between products or their data operands or formats. Using a CCF permits scripting of security system interaction and automation of processing of events and results by upstream and downstream security products.

Figure 6A:
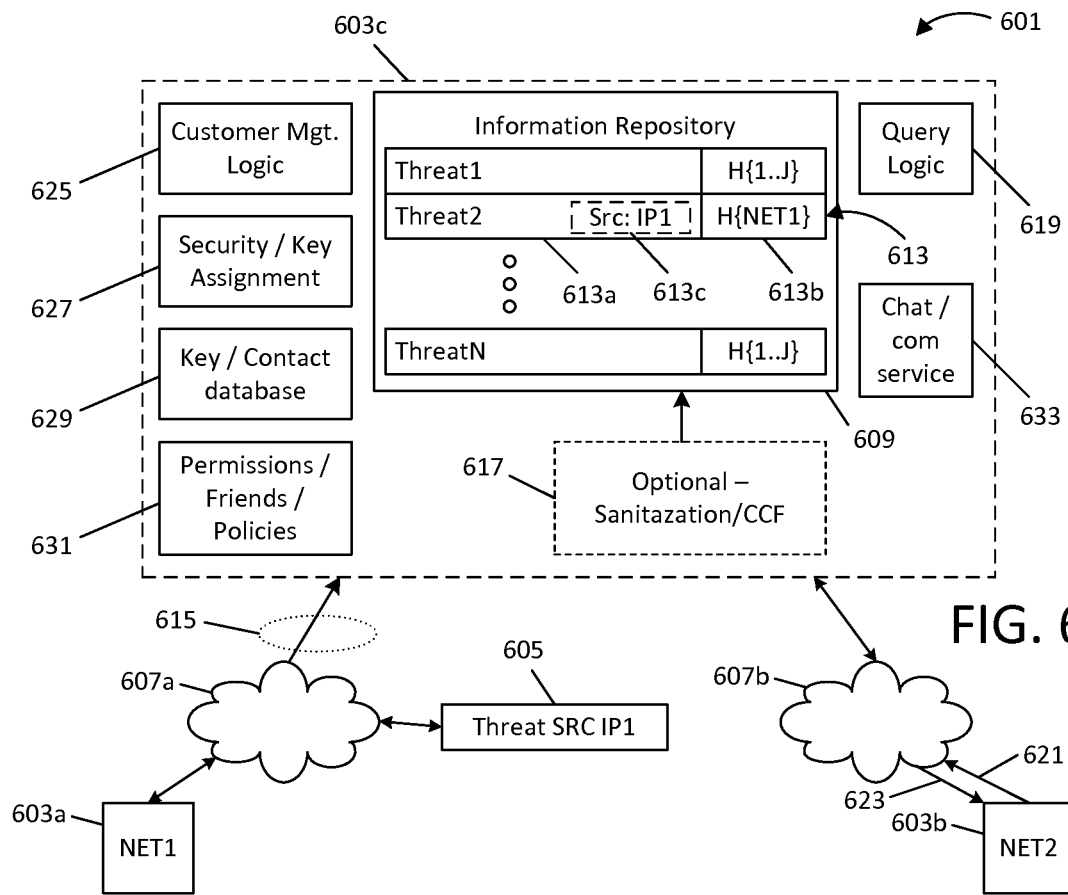
FIG. 6A provides an illustrative view relating to provision of security event pooling services.

FIG. 6A shows an exemplary scheme 601 that uses an information repository to store events relating to network security. Generally speaking, four entities are illustrated in FIG. 6A for purposes of illustration, including a first network provider 603a (i.e., an operator of "NET1"), a second network provider 603b (i.e., an operator of "NET2"), a source of a threat 605, and a party or organization 603c (e.g., a manager) that hosts the information repository; the information repository itself is designated using 609, representing a centralized database in this embodiment. Note that while the scheme of FIG. 6A involves a centralized database, it is also possible to have distributed mechanisms (e.g., using information stored directly within networks NET1 and NET2 for example), with a crawler or other mechanism used to acquire information and cache information at a query origin point or midstream network node as appropriate regarding queried network events, as discussed earlier. In one embodiment, each of the depicted networks (e.g., NET1, NET2 and the organization acting as a central service each has their own version of the information repository 609, as discussed earlier, with a local or distributed query system being used. In other embodiments, a repository can be stored just on client networks (e.g., NET1 and NET2), or just at the central service (603c) or in another manner. That is, the relatively centralized mechanism depicted in FIG. 6A is used to introduce basic concepts only and is exemplary.

In the context of the FIG., an "event" can be any type of information or data record that one network (or network administrator) might wish to log or to share with another network (or network administrator). Detect "threat" incidents are one such type of "event" that would be recorded in the ordinary course of network management. Typically, a "threat" is something that a network administrator might potentially wish to monitor, restrict or block; for example, a site, file, individual having inappropriate content (e.g., infringing or offensive content), or serving as a source of spam, viruses, or directed attacks would typically represent a threat. Note that any source or destination of traffic can represent a potential threat, e.g., as used herein, a threat can encompass a circumstance where a relatively benign site is evaluated to determine threat level (e.g., and is assigned a threat level of "none" or "low," for example).

In FIG. 6A, it should be assumed that the potential threat being evaluated has a particular internet protocol address ("IP1") and that this particular address IP1 has been evaluated by network NET1 as potentially being a source of improper access attempts, SPAM, viruses, inappropriate content, or other activity that should be monitored and/or blocked. For example, security systems within NET1 can evaluate address IP1 as part of routine monitoring of a source or destination of traffic across a network 607a (e.g., a wide area network or "WAN" such as the Internet). It should be assumed that network NET1 wishes to share its evaluation with other networks or parties such that such other networks or parties can evaluate and potentially block access to or from site IP1 even though access to or communication with such other networks or parties may not yet exist. Accordingly, network NET1 transmits traffic 615 to a machine or repository, in this case managed by party or organization 603c (i.e., a manager of the information repository), for purposes of logging one or more events and/or broadcasting those events or a related query. Note that there can be many event records generated that pertain to site IP1 and that an event can optionally be generated in response to a security alert (e.g., detection of an inbound attack), or in response to any other desired evaluation. In some implementations, this manager 603c can be a machine or set of machines within a common umbrella network (or under common management with) network NET1, e.g., with a common enterprise, such as the government or a large company. Even in this situation, the event logging function may be transmitted in part over a public network and that the event logging information may reveal sensitive information such as a vulnerability of network NET1, a source of loss (e.g., representing potential loss of personally identifiable information), or the location of sensitive sites or systems; thus, in some implementations, client 603a (e.g., the entity associated with network NET1) sanitizes and encrypts such information before transmission 615 (e.g., for transmission over a public network). Sanitization is advantageous if logging of events is to be maintained by a third party (e.g., a third party security services provider) and/or if logged event information is to be shared with third parties (e.g., business partners, specific third parties, members of a trusted circle, and so forth).

The information repository 609 logs reported events in a manner that is searchable. Logged fields for each event may include nearly any type of information, e.g., without limitation, any fields discussed below in connection with FIGS. 6A and 6B and, if desired, the information repository can be designed to store many different event types (e.g., mixed types having different fields or template information, optionally sorted by event type or class). Each event is stored as a discrete record in the repository 609 (or potentially multiple repositories), and is seen in this embodiment to include a threat event type, an IP address and a hash or digital signature associated with the corresponding event based on one or more keys unique to each different source of event reporting. In particular, it was earlier mentioned that an event can be generated by network provider 603a (NET1) that evaluates the source of the threat 605 as a "threat" and that a particular record 613 is generated and submitted to the information repository 609 to represent this evaluation as a specific event. Numeral 613a refers to the information logged for this specific event record, and numeral 613b represents the digital signature applied to (or the hash generated from) this event record using a unique symmetric key assigned to party 603a (i.e., and associated with network NET1). Note that the digital signature for each logged event will be dependent on the information on each threat record, as well as the key or keys used by the party that signed/provided that threat record; the information event record 613 in this case is also seen to contain information regarding the perceived source of the threat, i.e., source address (Src: =IP1). In the depicted embodiment, one or more shared keys can be provided to each client or network (e.g., parties 603a and 603b) by the party or organization managing the information repository, known only to these two parties; this symmetric key architecture can optionally be used to provide anonymity and capabilities for source-specified data filtering. As'mentioned above, encryption and signing are optional, representing a design choice for the specific embodiment, and alternate embodiments can use other forms of security (e.g., PKI, two-factor authentication) or no encryption or authentication capability at all.

It should be assumed that a second network provider (e.g., operator of "NET2") now encounters the network address "IP1" either as part of incoming or outgoing traffic via WAN 607b and wishes to perform a reputation check. In some implementations, this second WAN 607b also represents the Internet and can therefore form a part of WAN 607a. Accordingly, the second network "NET2" sends an event report or a query to the manager 603c, which then determines whether there is any available reputation information associated with network address "IP1." Note that as mentioned above, in other embodiments, this query can be run in a distributed manner, e.g., forwarded to multiple nodes (e.g., as a asynchronous query request). This information is received and processed by query logic 619, and is run against the (central or distributed) information repository 609. In this case, the query logic 619 will detect a "hit" because the argument "IP1" will match specific record 613 of the information repository (i.e., that record containing IP address field 613c matching "IP1"). Note that it was previously mentioned that event record 613 can be stored in a manner that is sanitized. In such a situation, there may be no information directly identifying the target of the particular threat record 613 as party 603a. However, the digital signature or hash stored for this record [H{NET1}] in this embodiment will correspond to only one shared key assigned by the manager of the information repository 603c. The manager therefore computes a hash using each known key until the manager finds a match between a stored hash and the newly-computed hash, which in turn identifies a particular key. In the context of filtered or restricted queries or data, the list of acceptable keys (as introduced earlier) can be restricted based on profile information, or another means of restricting the query and/or results can be used. In this embodiment, when a match is detected (e.g., representing correlation) the manager then optionally uses a key/contact database (629) to access a set of permissions specified by network "NET1." For example, such policies can specify which fields may be shared, a permitted list of recipients, and so forth. Note that it is possible for NET1 to be assigned many such keys, each associated with different policies and/or groups and/or potentially used for different event types. These policies and related information can be stored in database 631 (e.g., as part of a relational database including the information repository, a key/contact database, client network preferences, and other database information as necessary or appropriate) and retrieved as necessary. The retrieved permissions, in turn, can be optionally used to specify whether and how information regarding specific event record 613 can be shared with third parties. Assuming that network "NET1" allows its reported information to be shared with network "NET2," the manager of the information repository can respond with a reply to the query from party 603b with information providing reputation information for IP address "IP1," as represented by numeral 623 (all as consistent with permissions previously granted by provider 603a, as anonymously represented by the particular symmetric key used to sign the particular security event).

A few points should be noted about the scheme of FIG. 6A. First, a communication protocol for fast searching and response can optionally be implemented to ensure predictability in answering queries such as the query from party 603b. For example, a "cache-style" memory management process such as discussed below can be used to ensure that party 603b's query is answered immediately with whatever cached data is available (e.g. based on a synchronous response and associated command). In a distributed logging architecture (such as referred to earlier) this protocol is used to guarantee a timely response to party 603b. This query-response schema can also be applied at any client network (e.g., NET1) in responding to queries from a central service. If threat data is stored elsewhere (e.g., party 603a's network or in another location), the use of an asynchronous command relayed to other networks (or network machines) ensures that the data can be asynchronously retrieved and cached by manager 603c in case another query is received for the subject-information in the future (this information can at that point be immediately provided). Note that other communication schemes are possible, and the referenced cache-style protocol represents only one methodology for handling queries. Second, while a symmetric key sharing scheme is referenced above for purposes of optional encryption in-transit and anonymous correlation of a reporting source with a set of permissions, some designers may instead choose to store information without anonymity or using mechanisms for source identification and permission correlation. Finally, as noted earlier, "events" may include things other than "threats" and may refer to reputation of things other than IP addresses; for example, the same techniques can be employed for file name reputation (e.g., virus detection), evaluation of email sender domain names, identifying individual end users and many other types of arguments.

Note also that FIG. 6A shows that the manager 603c also employs optional sanitization 617, customer management logic 625, and a chat or communication service 633. In one embodiment, events can be reported using an automated web interface of the information repository 609 or an ACP (as described earlier); in such a case, especially if third party networks 603a and 603b lack sanitization protocols, manager 603c can elect to itself sanitize reported events or to convert reported data to a predetermined communication format (e.g., CCF) for storage in the manager's information repository 609. Alternatively, unsanitized information can be stored and then optionally sanitized as a part of any query processing or reporting of query results. In an embodiment which supports a set of source-specified permissions (e.g., stored in database 631), optional chat, email, or other social networking services can also be employed to share information or queries or filter results between cooperating networks (e.g., "NET1" and "NET2") or to otherwise provide for communication between these cooperating networks, e.g., based on at least one common "profile" characteristic. For example, if desired, an administrator of network NET1 can choose to provide contact, telephone and/or email information as part of a response to queries from other networks, with such information automatically forwarded to each querying network. Many other possibilities also exist, e.g., the administrator of NET1 can be notified that another network has reviewed event data from NET1 and can at that time elect to have such contact information offered to the administrator of NET2. If the parties have a pre-established relationship (e.g., as "friends"), the event reporting source ("NET1") can choose as part of its permissions to provide chat-status (either in connection with a query or event, or on a general basis). Such a chat or messaging service can optionally be linked to events or to the information repository 609, to permit network administrators (e.g., of networks "NET1" and "NET2" to share and discuss information regarding threats in real time or on an asynchronous basis). If also desired, this service can also be used to generate alerts, for example, to notify the party reporting an event that another party has generated a related event (i.e., an event with a common field). Such alerts can then be sent to a client requesting this feature, such as a network administrator for network provider 603a. Clearly, many such optional features and implementations exist.

FIG. 6A also provides detail regarding methods, services and business models. For example, manager 603c can host the information repository 609 and related services on a subscription basis, providing keys and information-sharing services for fee. Each client is managed via customer management logic 625, with one or more keys assigned to each client in connection with a subscription. If desired, each key can be provided on a temporary or one-time use basis.

Also, depending on the level of correlation established in response to a query (or a response), further actions can be taken. For example, in one embodiment, an event is detected at a first network. Responsive to this event, a query or a correlation is performed against information possessed by a second network (e.g., the query can be performed by the manager 603c as a standalone function, or in a manner integrated with the second network 603b). Additional actions can then be taken depending on the result of this correlation; for example, if the initial correlation yields a match, indicating a possible security risk, this correlation can be deemed to warrant further searching (for example, of a local database or one or more third party networks), conditioned on this match. In one embodiment, each of these three networks can belong to different parties, with the threat processing performed as a centralized or distributed service. In yet another embodiment, a service bureau can be offered (e.g., by manager 603c), which collects security feeds from multiple sources, that correlates these, and that initiates other queries or performs additional (local or remote searching, e.g., of stored incident records) depending on perceived risk of the event (e.g., threat). Clearly, many such permutations are possible.

Figure 6B:
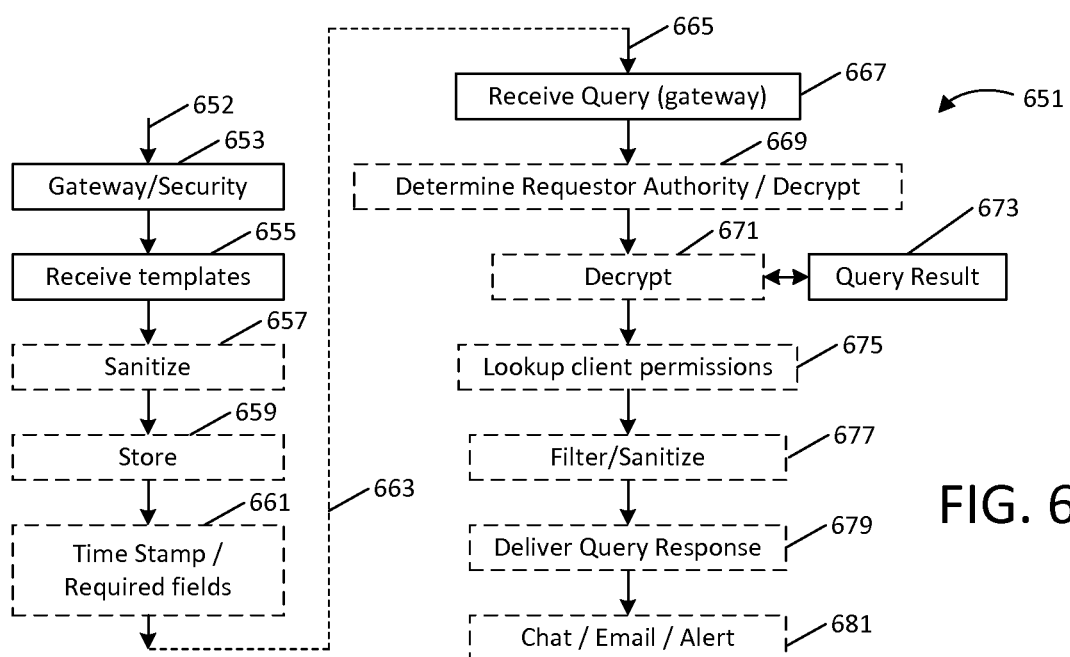
FIG. 6B is a block diagram showing functions performed by an information repository or other scheme for collecting and storing security events, and for responding to queries.

FIG. 6B shows more detail associated with a possible method, service or business model, generally designated using reference numeral 651. In particular, individual events are reported (automatically or selectively) as per numeral 652. These events can be transmitted over a private or public network for receipt by a gateway 653. The gateway confirms authenticity, i.e., that the event corresponds to a valid client, and also handles receipt and transmission errors as appropriate. For embodiments where event reporting is encrypted, the gateway 653 also provides decryption services. In one embodiment, as referenced by numeral 655, the reported events are received in the form of predefined templates using specific fields, e.g., in a CCF, for example, as represented by the non-limiting examples discussed below in connection with FIGS. 6A and 6B, and/or otherwise using a STIX- and/or Taxii-compliant protocol. The event reporting can also be made interactive, e.g., using an event reporting interface of the manager 603c, with each template being created by the client network and/or the information repository, as desired. In one embodiment, as noted, each client has client software (e.g., an ACP) that creates the template format and uses a VPN or secure transmission scheme to transmit the event record to the information repository. As depicted by dashed-line blocks 657, 659 and 661, the information repository optionally sanitizes, stores and generates time stamp information for each record as appropriate, for example, in mass storage, server memory, on magnetic tape, or in another manner. These general functions complete an offline process via which each event is reported and logged. Note that in a dissociated model, these logging functions can each be provided by multiple parties, and that query functions can be provided by these same parties or a different party or service.

As referenced by dashed-line 663, a query process is performed at a later point in time for newly-arriving queries (663). Each query can be received by a gateway 667 which, for example, services a number of sources of queries, such as third parties, different network providers or administrators, and so forth. As represented by dashed-line block 669, in one embodiment, query access is limited to specific individuals or clients and is a non-public service through which sensitive information might be transmitted; accordingly, in this embodiment, inbound queries are screened to verify requestor authority and/or to perform decryption. If a query is valid, as represented by numeral 671, the query is executed, returning a result 673. This result can provide a null response if the query is unsuccessful and can also return multiple "hits," dependent on design. Per numerals 675 and 677, a set of client permissions can be looked-up (e.g., using the optional "client key" as an anonymous permissions' index, if desired), and retrieved results sanitized or filtered (e.g., according to client permissions or according to policy of the manager of the information repository). A query response message 679 can then be generated and transmitted as desired, for example, using the "cache-style" response scheme mentioned previously or another scheme. Finally, a chat, email or alert service can also be established, optionally as part of the query process, per numeral 681.

Figure 7A:
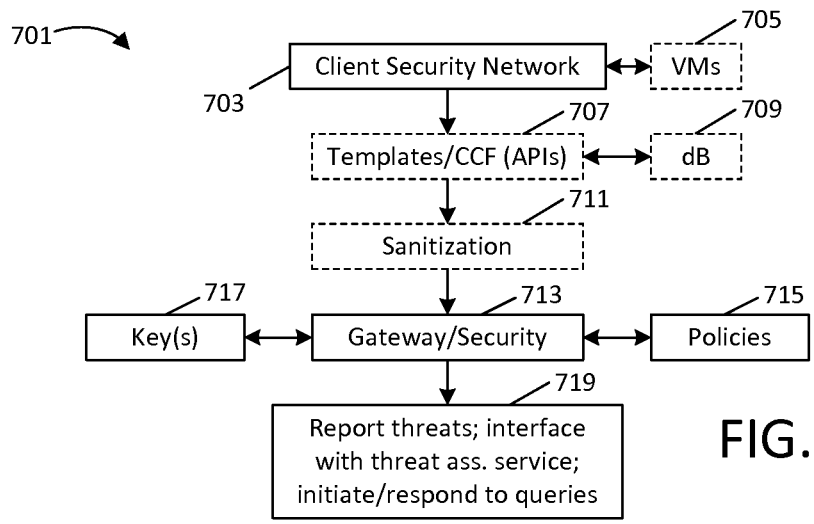
FIG. 7A is a block diagram showing functions associated with an optional automated client portal (i.e., an interface).

FIG. 7A is used to provide detail regarding information sharing and/or reporting service (e.g., as with manager 603c from FIG. 6A); this detail is generally designated using numeral 701 in FIG. 7A. Note that the term "client" is used in reference to FIG. 7A not just to identify a private subscription or other third party service, but rater, to denote actions of any party in sending event information to an information repository or source of a query. As mentioned, the code can be part of a client module or software application previously distributed to the client, or implemented as part of a central service. Generally speaking, such code consists of instructions stored on non-transitory machine-readable media that, when executed, causes a client machine (e.g., server, computer, portable device, etc.) to act in a specific manner. More information on such a service, including the optional use of VMs 705 and events and remedial actions, configured as templates 707, will be provided below. As referenced earlier, an architecture is advantageously employed that permits cross-product or cross-platform communication (e.g., between products of different vendors) in a manner normalized for communication and in a manner that permits automated or scripted response and interaction. For example, each security system can be instantiated using one or more VMs as part of a scalable security service for a client network 703, using an architecture and communications format that is conducive to standardized or normalized event reporting, querying and/or logging. Per numeral 711, the client module or code optionally uses sanitization processes and common communication format (CCF) to facilitate anonymous reporting of data and logging of events in an efficient, searchable manner. Events can be reported to a third party information sharing/reporting service, or instead be logged in a local client database(s) 709, for example, optionally performed as a server process or a cloud process, as referenced. As depicted by numeral 713, the client can then choose to share information via its gateways with a central service or third parties or to any particular query source or other network destination (e.g., in a distributed environment). The gateway 713 can be configured to use security processes which, for example, encrypt reported data, or otherwise restrict reporting to an information sharing service or in accordance with any pertinent policies 715. Finally, on a solicited, unsolicited, immediate or batched basis, the client can report events, initiate queries or provide query responses as appropriate, e.g., to a third party query source or logging service, per numeral 719.

An information repository as described provides many advantages to network security administrators and to providers of network security. First, it is possible for network administrators to share information with other organizations and query a much larger set of pooled data, to better evaluate potential threats, and to communicate directly or indirectly. This pooling of information can be across entities or organizations, but not that this is not strictly necessary for all embodiments, e.g., it is possible to combine data from multiple domains or networks within a single organization; for example, a modern organization's network infrastructure might include many subnetworks for different sites, different countries, different classes of employees or contractors, and different network types (e.g., VPNs). The mentioned architecture facilitates pooling of information from multiple sources irrespective of organizational boundaries. A common communications format (CCF) simplifies these processes and, using the teachings provided below, it becomes possible to automatically leverage such pooled data (i.e., events) to recommend or generate automated responses; such automation can also optionally be shared by network security administrators seeking to better mutual counter threats. Once again, organizations which might otherwise refrain from participating in such an information sharing scheme can benefit from the sanitization processes discussed above, with details of reported events being made both (a) anonymous, and (b) selectively deliverable according to source preferences.

Figure 7B:
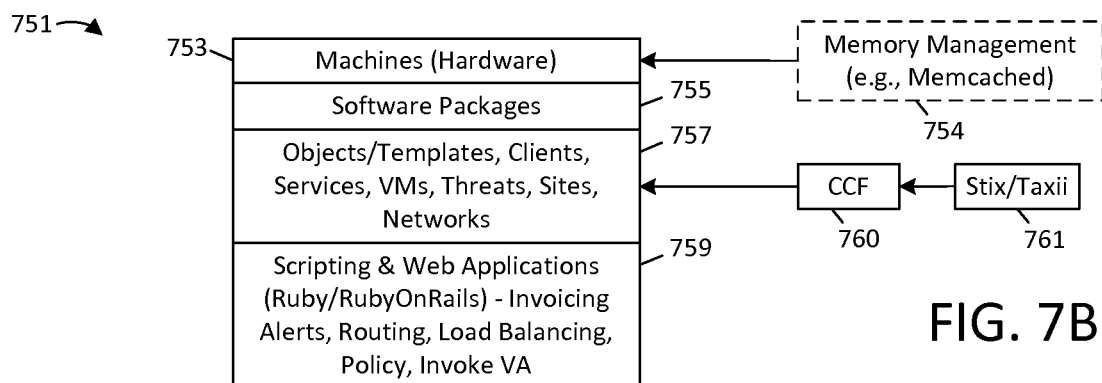
FIG. 7B is a block diagram showing a layered architecture associated with a client security network.

FIG. 7B shows an exemplary layer model 751 to illustrate different levels of code/implementation for implementation a network security system, for example, employed as part of a client network. In particular, respective layers include machine configuration 753, application software implementation 755, the use of objects and templates to provide an event data structure 757, and scripting and web applications which effectuate a normalized communication infrastructure 759. Thus, an entity wishing to build a security infrastructure installs appropriate hardware and/or software and/or codes the individual machines (hardware) to serve as a platform for the different, supported software products, and codes any desired virtualization infrastructure (if a VM approach is used), all as represented by reference numeral 753. Each software product either natively supports (or supports through the use of one or more suitable APIs) interaction with a memory management scheme 754 and an automated client portal to provide support for real-time queries as well as more sophisticated analysis as indicated by box 754, in one embodiment, this memory management scheme can be implemented as a TCP-based form of direct access, for example using Memcached, or using another framework. For example, as described earlier, it is also possible to have a set of diverse storage schemes, e.g., based on "ArcSite" "Splunk" and other specific event management schemes as introduced earlier. Layer 755 represents software applications on this infrastructure, in a manner where instances form network security components, implemented on a per-machine basis or as virtual machines (VMs), as desired. At a third layer, template generation and data mining provide a normalized event data structure, for example, by converting all events and raw data into a standardized XML description such as introduced just above. Finally, web application infrastructure and associated APIs and scripting are implemented as a fourth layer, as depicted by box 759, with a standardized interface (i.e., cross network or systems communication format) being indicated by numeral 760; in one embodiment, this infrastructure relies on code and scripting written in Ruby and Ruby On Rails to implement functions of invoicing, VM configuration, secure web portals, load balancing, automated policy generation responsive to detected threats, and commands between VMs. In another embodiment, as mentioned, code can be designed so as to accommodate newer examples of a CCF, such as provided by the "Stix" data formatting standard for network-security-related events, and "TAXII" for exchange of related data (e.g., per numeral 761).

In a typical application, a security network can be designed to perform intrusion monitoring and/or detection using distributed threat analytics and, responsive to results of intrusion analysis, to automatically take one or more actions using one or more security products (optionally instantiated or run as virtual machines), though a CCF or translation layer (e.g., implemented using one or more API's). A virtualization infrastructure, as discussed in the aforementioned patent applications which have been incorporated by reference, permits services to be added and subtracted dynamically, including new security software products from commercial vendors, potentially even in situations where those products are natively incompatible with one another; this environment also facilitates easy scaling of desired or selected security services. Scripting of automatic responses and the use of templates for events and responses (for example) permits generation of an infrastructure where, notwithstanding which security software products are selected or deselected, reactions can be automatically invoked as reactions to detected threats (that is, these reactions can be designed for example even before services are selected, as part of the general infrastructure). To provide several examples, a threat detected by the intrusion monitoring or detection service (IDS) can be converted to a template or object with specific fields or attributes, and these fields or attributes can be used with a command or communication infrastructure to invoke macros or scripts that then import the rules, threats or other data into various security systems used on behalf of a specific private network. A template created in this manner can also be used for event reporting or logging, as introduced above. As should be apparent, each security product effectively relies on translation (either native, or effectuated with an API) to the common communication format, with standard query formats and scripting as appropriate. This architecture facilitates an environment where additional rules and policies can be automatically created and dynamically applied, providing a new degree of scalability and flexibility in network security management. Perhaps otherwise stated, normalizing inputs and outputs of various security products in a virtual environment facilitates a framework where services can be dynamically added as desired, and where new security policies and rules and interactions between these products can be automatically and/or flexibly created and applied. In addition, any generates threat responses can be stored and shared with similarly-situated networks (e.g., members of a trusted circle) or shared pursuant to query, as discussed earlier.

The security software products used by an exemplary client network can include an intrusion monitoring system, also referred to sometimes as an intrusion detection system (IDS), a firewall system (FWS), an intrusion prevention system (IPS), a security event incident management service (SEIMS), an antivirus or anti-malware service (AMS), a vulnerability assessment tool (VAT) or any other form of security software product (e.g., for email or any other form of network traffic). Generally speaking, an IDS monitors traffic patterns using distributed threat analytics, meaning that packets or messages representing diverse communication (different sessions, users, or destinations) are analyzed to detect patterns representing a distributed network threat. If the IDS detects such a threat, for example, concentrated requests for access to a web page of a private network from a single source or small group of sources (representing a possible denial of service attack), the IDS typically generates an alarm, alert or other response to indicate this fact. Pursuant to the teachings introduced earlier, such a discovery can also be scripted to generate automatic event reporting and/or queries, e.g., to a central service as discussed above. As part of an integration scheme, in one hypothetical implementation, an IDS can review local, fast access memory (e.g., a cache implemented in random access memory "RAM") for security threats matching one or more identifiers for machines or applications (e.g., IP addresses, such as an IP address range passed as part of a query, a MAC address, URL, etc.). If the IDS has a record matching a specified identifier with a specific threat indication, the IDS can launch a query to see whether other, similarly-situated networks have seen the same threat (a determination of these networks, as mentioned, can be preconfigured by the client, e.g., as part of a group membership), or can be dynamically defined. The client network itself can select a threat level, or rely on a central service to select or augment a threat level. For example, if a central service replies back with a threat ranking that indicates risk (e.g., threat level ="high"), the IDS can send a response to a FWS that causes the FWS to block the associated traffic, in real-time. If the IDS does not detect a threat, or the client network receives no response to its query (or alternatively, a null response), it might then permit an Internet session (e.g., with the threat source) to proceed on an interim basis. If network delays (e.g., owing to the need to access mass storage or distributed databases) cause a valid threat to be not detected, an asynchronous process run (in addition to the non-response or null response) can cause the client network to be updated, such that the IDS and/or FWS are "ready" (e.g., configured for blocking) should a subsequent Internet transaction generate security event data correlated with the suspected threat. Clearly, other implementation options also exist.

Figure 7C:
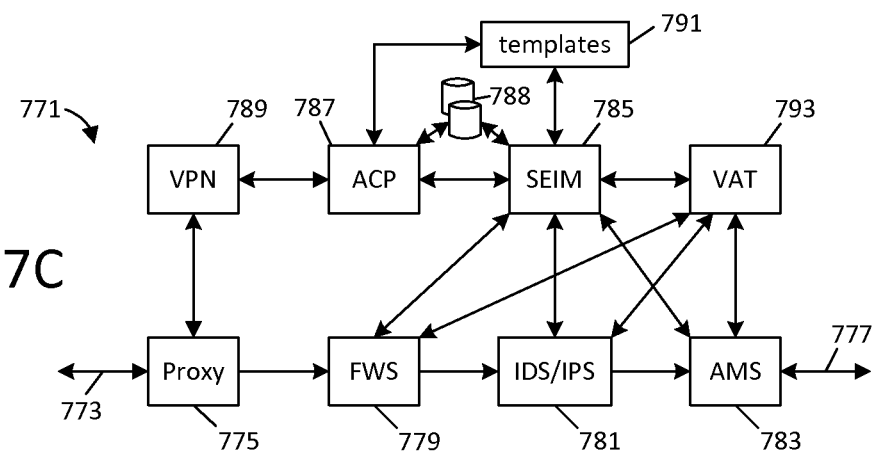
FIG. 7C is an illustrative diagram of a hypothetical client network security configuration.

FIG. 7C is a block diagram used to explain a hypothetical configuration 771 where different security systems (e.g., different types of services, and different vendors' products) are used to provide for network security. In particular, the FIG. indicates that a client has built a security infrastructure that receives inbound traffic 773 from an external WAN (e.g., the Internet) and processes that traffic either in response to outbound traffic from the client network or as inbound traffic to that network, with both directions of traffic represented by arrow 777. The client in this configuration uses a proxy service 775 which externally serves as the apparent destination and source of Internet traffic with the client, a firewall service (FWS) 779, an intrusion detection or prevention system (IDS/IPS) 781 and an anti-malware service (AMS) 783, all of which are used in line to screen inbound and/or outbound traffic. Security-related events detected by these various components are routed to a security event incident management service (SEIMS) 785, which logs events as necessary in database 788 and otherwise interacts with an automated client portal (ACP) 788, as has been discussed earlier. The ACP permits the client to define query- and event-related processes, and to interact with a central service (or other client networks) to effectively implement as desired a peer-to-peer data pooling service as described earlier; associated traffic can be routed via a virtual private network (or VPN) 789 to such a central service. In addition, the network (and the SEIMS in particular) in this embodiments supports the use of templates 791 which, for example, can be downloaded from the central service and automatically instantiated to provide for instant response to perceived threats, based on a remedial measure provided by the central service, Such templates can also be generated by administrators of the client network or third party consultants. As noted earlier, some embodiments can provide for automated or client-elective use of a vulnerability assessment tool (VAT) 793 as a response to a detected threat. Note that the interaction invoked between network elements (e.g., the depicted configuration of connecting arrows in FIG. 7C) is dependent on the services and configurations selected for the particular client, with additional rules and configurations typically applied on an evolving basis, i.e., as threats are detected and systems change. The depicted architecture is exemplary only, but provides an example architecture to illustrate that an ACP can add templates or responses, or receive event data or queries or query responses from, the depicted client network 771.

Figure 8A:
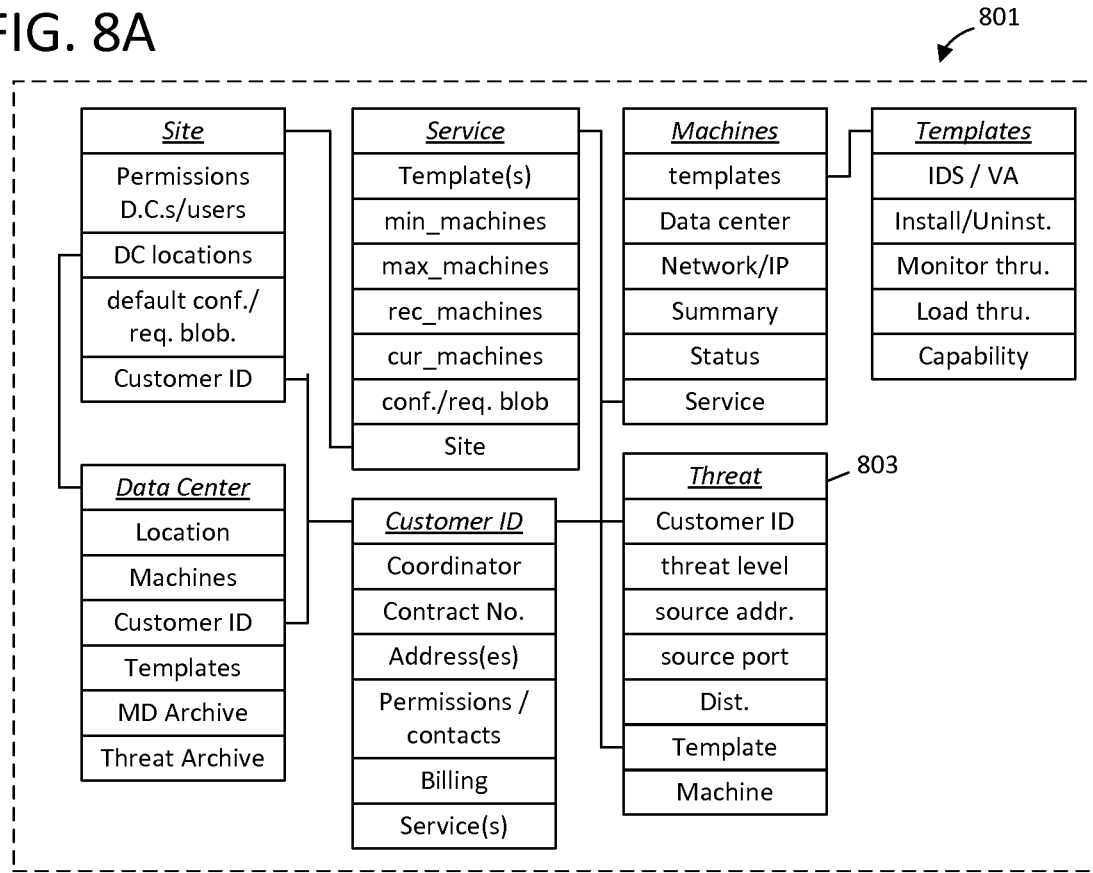
FIG. 8A provides an illustrative diagram showing a template structure that can be used to normalize data exchange and facilitate communication between networks, e.g., to log and/or report possible network threats.

As alluded to earlier, standardized communications and passing of events back and forth can be effected in a number of ways. FIG. 8A is used to illustrate (801) an exemplary template-based format for inter-security system communication. The depicted structure can be implemented using an XML translation scheme. To provide a specific example, a "threat template," generally designated by reference numeral 803, can be used to provide normalized, translated data in this implementation, identifying specific results determined by a client network or specific security to represent security events perceived as threats. Note that this data format can be used in a number of ways, e.g., it is possible as mentioned above to receive and correlated and/or compare similar events detected and reported by IDS software products of two, respective different IDS product providers; this in turn facilitates correlation of event data across multiple client networks (e.g., which might have purchased different IDS products from respective vendors); this facilitates the ability of the central service to effectively provide a reputation service. The template generated by one of these products is substantially identical to the template generated by the other, indicating the template or service producing the threat, the source address and port, the targeted customer, and whether the threat level is gauged at a specific level, e.g., "low," "medium" or "high." Note that APIs built in advance as part of the infrastructure and, more specifically, the translation layer, perform any conversions/translation to get to these results. Thus, for example, an IDS from one particular vendor may not natively represent threat levels in this manner, but the translation layer converts data output by the IDS into this type of assessment, to normalize that data and enable the comparison or sophisticated behavior just mentioned. This was exemplified earlier, If two IDS systems evaluate the same traffic from the same source to be threats, one determined to be a high threat, the other determined to be low for example, this information could be considered in selecting a long-term IDS product, or in weighting query results.

In FIG. 8A, the "services" template identifies a software application, the "machines" template indicates a specific piece of hardware assigned one or more virtual machines and the "templates" template identifies a single instance of a service running on a machine as a single virtual machine. For example, a particular "service" would reflect a specific vendor IDS product (intrusion detection or monitoring product, vulnerability assessment tool, or another type of product). As implied by the template's attributes, each created template identifies current throughput, active status, and whether the specific software instance has a capability to detect specific threats (e.g., malware, denial of service attack, etc), assess specific vulnerability (e.g., port scan or software misconfiguration), block ports and so forth, as represented by an alphanumeric code for the "Capability" attribute. To exemplify usage, if a threat template produced from a specific source (e.g., "template" template) has a specific threshold (e.g., threat >="medium"), then another template (aka an instance of a VM in this example) or a service with a specifically desired capability type can be activated and passed the threat as an argument as a reactive measure; to further elaborate this point, a firewall service (FWS) can step-in in response to a broadcast notification identifying a specific threat, in a manner that all "listening" FWS VMs (or a specific FWS) add the source identified in the provided threat argument to its list of blocked sources.

Figure 8B:
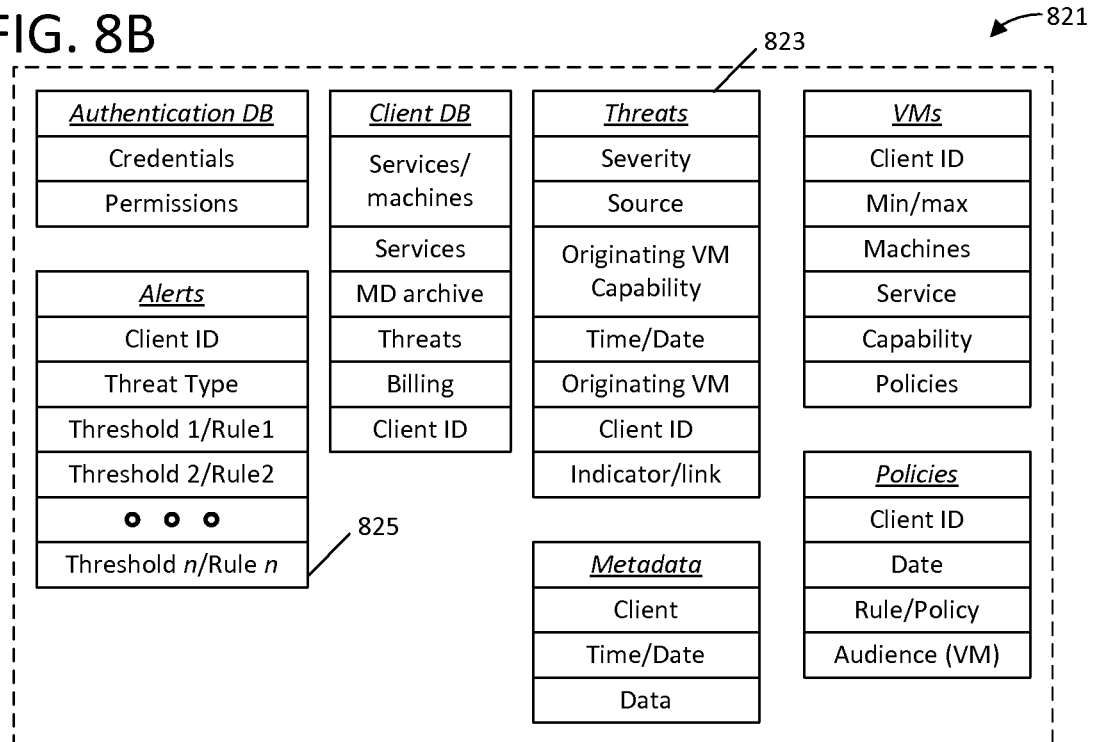
FIG. 8B provides an illustrative diagram showing how a relational database can be implemented in an alternative architecture to provide for normalized communication and data exchange.

FIG. 8B provides an illustrative diagram 821 showing how a relational database can be implemented in an alternative architecture to provide similar capabilities. In this example a database can be established to log all threats as they occur. This database establishes a de facto data structure that can be used with scripting to invoke specific functions or services. For example, as indicated by numeral 821, the database identifying threats can have a field for originating security product capability, threat severity level, source, originating security product (e.g., VM), associated client, a link to associated metadata, and other information. If a security product receives a broadcast notification of a threat record from another specific product (or an central service or other network), another security product or response can be invoked and passed the specific threat or other event record as an argument, Note that the relational database model can also be used to manage credentials for various clients, generate alerts, identify the client infrastructure, sort metadata, identify security products and/or VMs, and store policies (e.g., in a manner that can be called up an easily edited by a client administrator). For example, as indicated by an alerts database 825, different thresholds can be used to generate different types of alerts for the specific client network, for example, using different communication mechanisms, provided to different client personnel, or in another manner; such a mechanism can also be used to generate a remote query, e.g. to a central service, as mentioned.

For both FIGS. 8A and 8B, not all possible templates or databases are shown, and it is within the capability of a software designer with experience in these fields to build a translation and normalization model using a template, object or relational database model and to rely on a standardized interface for passing communications and arguments back and forth between machines, and generating associated reactions; STIX and TAXII are examples of another such format. A standardized interface and optional use of templates permits client networks to be automatically adapted in response to specific threat levels, and to facilitate data exchange and translation. The use of a memory management architecture that provides for enforced real-time queries as well as more long term (e.g., sophisticated) processing also leads to enhanced system capabilities. Note also that in connection with the information sharing principles discussed earlier, nearly any piece information can be reported as an event, i.e., events are not limited to threat reporting, and one skilled in the art can apply the information sharing principles discussed above to other types of events (e.g., anything represented by FIGS. 8A or 8B), or potentially outside the field of information security.

Figure 9A:
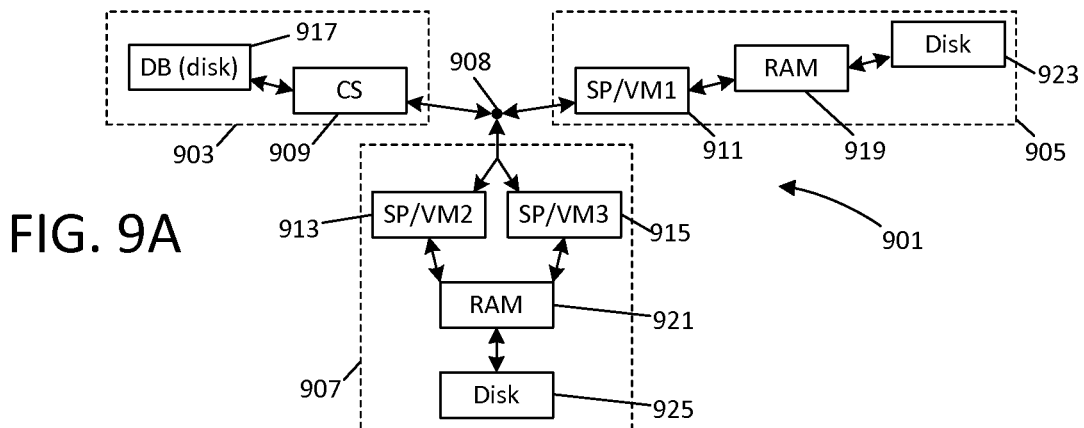
FIG. 9A provides an illustrative diagram showing an example network where possible threats are reported by client networks to a threat assessment service, and where the threat assessment service and/or clients can run queries directed to each other.

FIG. 9A provides an example of a hypothetical configuration 901, in this case, consisting of three networks 903, 905 and 907 collectively running four services or security products, referenced by numerals 909, 911, 913 and 915. FIG. 9A is used to introduce come communication protocols that help ensure meaningful responses in one query-based system. Note that as was introduced earlier and as is represented as running on the third network 907, more than one VM (e.g., 913/915) and/or network security product or product type can be employed at any network. Each network as depicted can be a client network and/or a central service as referenced earlier. As before, each network can have one or more computers (e.g., a servers) running software to implement security services, as appropriate. Each VM should be assumed to be any type of security software product, such as a IDS, IPS, VAT, SEM, AMS, FWS, and so forth. Also, either or both of the security product and/or VM emulation software can be presented as instructions stored on computer- or machine readable storage (i.e., a physical form of storage media, such as an electromagnetic or optical disk, electromagnetic, state change, resistive, or flash memory, or another physical device that provides storage accessible to a computer).

The first network 903 is indicated as having dedicated random access memory ("RAM") space 917, the second network 905 is illustrated as having both RAM 917 and local disk repository 923 for event data, and the third network is seen as having multiple security products 913/915, which share both RAM 921 and a shared local disk repository 925. The RAM 917, 919 and 921 represents any form of "quick" or "fast" "access memory," that is, memory local to the network and providing relatively fast access times; while depicted in FIG. 9A as comprising RAM (e.g., dynamic RAM), other forms of memory, volatile or non-volatile, can also be relied upon for this purpose. The fast access memory is to be distinguished from relatively slow memory that does not necessarily provide real-time response capability, such as a mass storage device (represented by disk storage 923 or 925). This latter memory can be physically part of, or attached to the servers in the respective networks 905 or 907. As represented by 908, each network interacts with the others using a wide area network (WAN) access path, where communication is in the form of packet-based transmissions. Note that in a typical implementation of a pooling and query processing service (e.g., as discussed earlier), one client network (e.g., network 905) may have no knowledge that another client network (e.g., network 907) is similarly situated; thus, each network in such a configuration communicates with the central security service (e.g., network 903) for purposes of event reporting and query processing. Each network has a communication interface (e.g., a network transport or TCP manager dedicated for this purpose), not seen in FIG. 9A. In this example, the first network corresponds for example to a central service 909, with the various networks configured to send queries to one another with enforced synchronous or asynchronous response as desired.

Figure 9B:
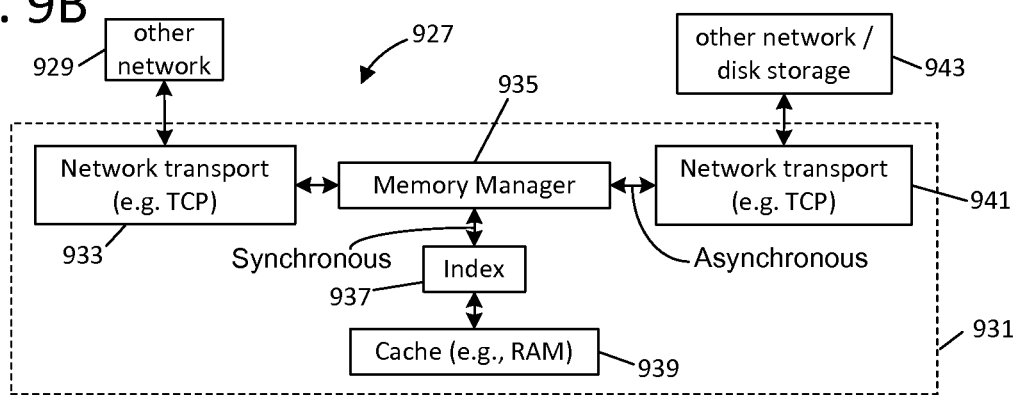
FIG. 9B provides an illustrative diagram showing a memory management scheme for enforced query response interaction.

FIG. 9B provides more detail regarding a cache-style management scheme that can be employed to enforce a desired query-response framework. This scheme is represented in FIG. 9B by reference numeral 927. In particular, it should be assumed that a network in question (931) is to receive message queries, notifications or configurations from a source network (represented by box 929). As an example, in a distributed information sharing system, it might be that the source network (e.g., the IDS of a second network provider such as from "NET2" from FIG. 6A or a central query routing service) seeks information regarding a specific IP address. An inbound message (e.g., a query) may be structured in a manner that requires a real-time response, or alternatively, it may not require such a response; in contemplated applications, the nature of the response will be indicated by the command or query type, and generally for a threat query, a real-time response will be requested. Note that each inbound message optionally uses a common communication format (CCF) such as was identified earlier; the receiving network parses data stored in this format (as applicable) such as for example a look up to determine whether the receiving network (and any event archiving system) is aware of a "high" threat level associated with IP Address (identifier) 123.123.123.123. Each inbound query is forwarded from a network transport layer 933 to a memory manager 935. The memory manager first determines whether a given inbound communication requires a response within a predetermined period of time (e.g. whether it requires a "real-time" response). This determination can performed a number of different ways, dependent on desired implementation. For example, in one embodiment, each inbound query can include a command or field that specifies a response time (e.g., that includes a specific time parameter, or that presents a bit or field alerting the memory manager that a response is to be provided within a defined interval). In other embodiments, this determination can be based on the source of the message, on a specific command included with the query (e.g., where "command A" specifies an operation and "command 'A-1'" specifies the same operation but mandates a fast response), inferred based on circumstance, or in some other manner. In the schema used in one, specifically contemplated implementation, each inbound query either specifies fast response (e.g., <1second or "1s") or it does not specify this fast response, and the memory manager reacts differently depending on this specification; if there is a need for a fast response, the memory manager checks an index 937 and local cache 939 for data representing a response, and immediately forwards any data that it has. This forwarding occurs via TCP-based network exchange via box 933. If no matching data is found, no data is provided back to the source of the message (i.e., either a null response is provided within the predetermined time frame of 1s, or no response is provided and the original source of the query assumes the response is null). In the event of such a "cache miss," the network 931 can perform more sophisticated processing that is not expected to provide a real-time response, either performing the processing itself, by forwarding a request for processing or a query to another (third) network or by retrieving data from slower storage (e.g., mass storage), all as represented by box 943. As denoted by box 941 and the term "asynchronous," this operation can be performed using a network transport process, and results in the memory manager 935 updating its cache (and potentially its index) responsive to this query, but generally not automatically sending response data (e.g., after the predetermined response interval) to the original source network 929.

If an inbound query is determined to not require a fast response, the operation can be quite different—for example, the memory manager 935 is not required to send a cache-based response, but instead can await completion of processing responsive to the query (e.g., potentially involving relay of a configuration or query, or an entirely different query) to a third network (e.g., 943); only once this processing is complete and/or a response received from storage/network 943 is substantive data responsive to the original, inbound query returned to original, source network 929. Note that slight variations in this methodology can be applied, dependent on embodiment. For example, in one implementation, if no fast response is required, the memory manager 935 can indeed fill the response with data from cache and then send a second response with updated data as soon as the "asynchronous" operation is complete. As denoted by the term "synchronous," the memory manager can be made interrogate its index 937 and local cache 939 immediately in response to the inbound query, with an immediate, automatic response if a match is found. By contrast, as denoted by the term "asynchronous," for some operations, the receiving network 931 is primarily concerned with updating its cache and may or may not be required to provide a (further) response to an original source of the inbound query.

Reflecting on the schema introduced by FIG. 9B, several advantages and benefits should be apparent. First, by providing cache-style management, with a synchronous/asynchronous response structure, both enforced real-time processing and more sophisticated query processing can be supported. If it is for example assumed that the first (source) network is a client network, this network can query to whether a new event represents a high-risk threat. This query can have multiple fields, such as a field for sender IP address and a custom-configured or vendor-configured question, such as whether a threat level ="high" (another field) is associated with the provided IP address; using another typical example, the IP address can represent a destination IP address or other identifier (e.g., associated with inbound or outbound traffic), and the threat level field can be configured to query whether the IPS is aware of any vulnerability associated with the destination, or whether the destination represents (for example) a dangerous website. The query can pass a template between machines, with some or all fields of the passed template populated and used to scan for a match. A query can, depending on configuration, itself expressly demand immediate response based on data on hand (e.g., from the central service or a client network receiving a query redirected by the central service), or this can be understood from context by the recipient. The receiving network 931 searches its index 937 and cache 939 and (hypothetically) determines that the provided IP address indeed does have a threat level associated with it of "high"—with this data being stored in fast access memory, the receiving network 931 is capable of immediately sending this data to the source network (929), in the form of a notification response, which can then take action as appropriate. This type of processing can be applied to any form of Internet traffic, including email exchange for example. Changing the hypothetical, if the receiving network 931 did not have a match in local memory, the source network might either receive no response or a null response, and would presume (based on no response within the specified time) that no threat existed; the receiving network 931 optionally could then to asynchronously investigate the query, for example, using a query to the third network (943, for example, enquiring via separate query whether the provided IP address was associated with any issues). The third network 943 could perform sophisticated processing (such as by maintaining a count of such queries, or performing processing or other analysis of metadata associated with the original query). If the third network 943 then determined responsive to such a query that a threat was associated with the provided IP address, it could then provide an "asynchronous" response to receiving network 931 which then would update the cache 939 and index 937 as appropriate. Note in this example that the query from the receiving network 931 to the third network 943 represents a type that does not require fast processing, and so the third network 943 is not required to pass a response back to receiving network (e.g., a central service) 931 until its processing is complete. Thus, as should be apparent, a multi-tier response structure (e.g., involving two or more response periods such as described) facilitates interaction between networks and/or security services using a common communication format (CCF). Similarly, from the vantage point of any particular security software product vendor, integration is facilitated by an understanding of a command structure that permits leveraging a framework for response types based on need; this facilitates a powerful infrastructure, with fast response timing relatively insensitive to the number of clients networks; this greatly enhances scalability.

Figure 9C:
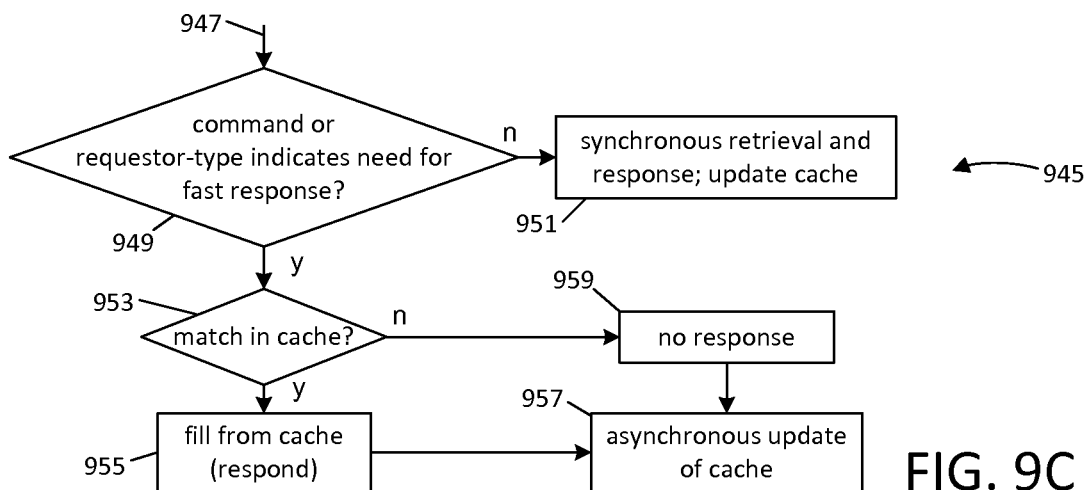
FIG. 9C shows a method block diagram used to explain a two-tier memory management scheme that supports both enforced (synchronous) query response time as well as asynchronous response times.

FIG. 9C provides a flow diagram 945 associated with the memory management scheme just introduced. In particular, the need for fast response can first be determined, as represented by decision function 949. If such a quick response is needed (y) and a match is found in cache per decision block 953 (y/y), the data is retrieved from cache and sent back to the source of the query, per block 955. The process can then optionally continue on to also asynchronously update the cache, per numeral 957; as mentioned, this update can be performed by the network in question (e.g., an ACP, depending on its function) or can be filled from remote storage or in response to a further query to another network. If the inbound query requires a fast response, but the cache does not contain data responsive to the query (y/n), the network in question can perform retrieval and response outside of the predetermined time period, updating the cache as data is obtained, per function blocks 959 and 957. The withholding of the "fast" response within the specified time period permits the original source to presume that there is no threat, i.e., to equate no response with no threat, in real-time. In contemplated embodiments, no response need ever be provided to the original inbound query even once cache is updated (e.g., a receiving network may have moved on to other real-time actions and may have no current need for this data). At the same time, facilitated by the cache update, the network in question is ready to respond, with data on hand and adapted for fast, cache-style access, should another, similar query be prospectively received (whether from the same source of the original query, or another network). Alternatively, if the inbound query does not need an immediate response (n), data can be retrieved and forwarded to the original query source once it is obtained, per function box 951 (e.g., when available, irrespective of any predetermined time period defined for fast response).

As should be apparent to those having skill in computer programming, FIG. 9C illustrates a two-tier timing structure for responding to queries, but three, four or greater tier architecture can also be used, each tier providing processing for messages having different needs. The two-tier example presented in FIG. 9C is illustrative only.

Figure 10:
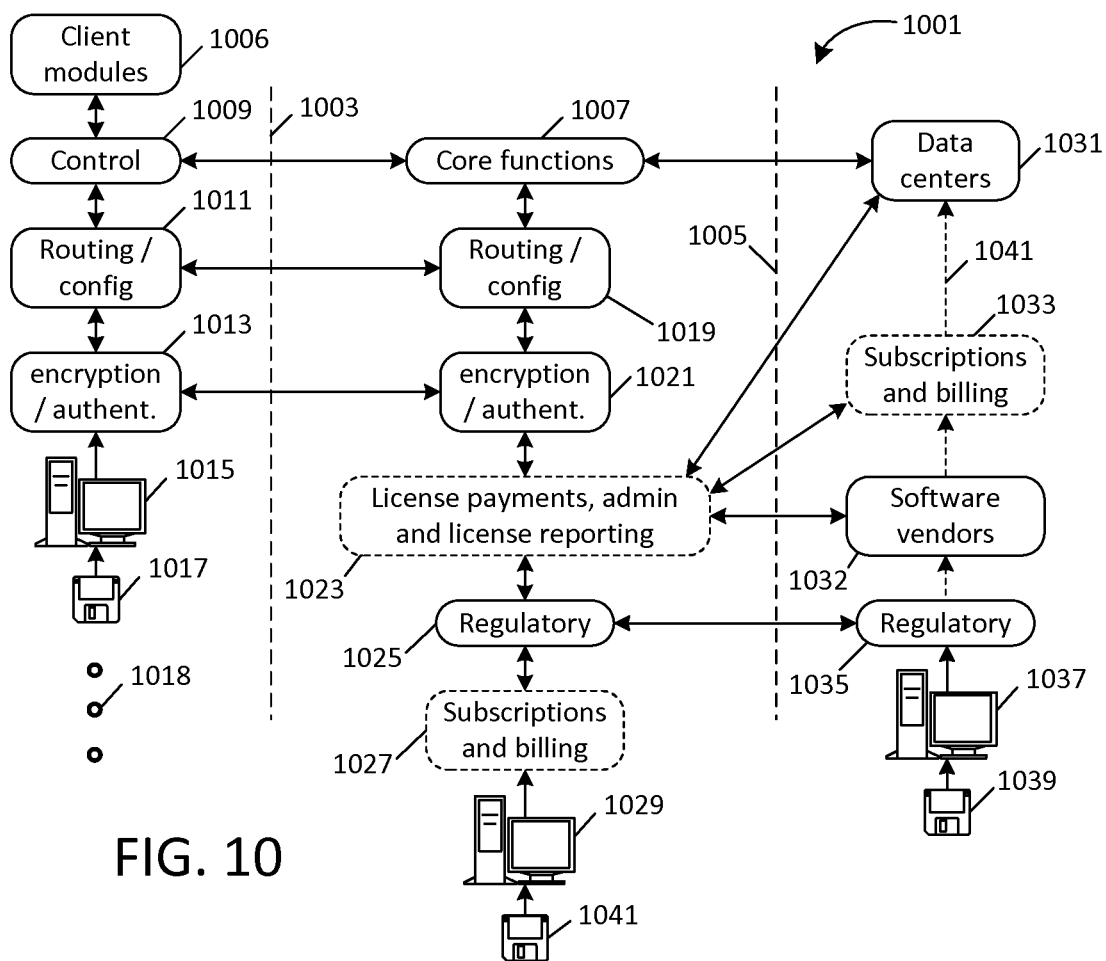
FIG. 10 provides an illustrative diagram used to explain different implementations and business models for administration of the various services, methods and techniques discussed herein.

FIG. 10 is used to explain different allocations of responsibility, depending on implementation, and to explain some differing business models. A general architecture is represented by numeral 1001, with the architecture divided into three horizontal partitions (separated by dividing lines 1003 and 1005), to indicate different locations where various software components or responsibility can be implemented. First, a leftmost partition represents software and/or modules that can be installed on a client network in some implementations, generally represented by reference numeral 1006. A middle partition represents functions that would typically be installed in connection with a central service. Finally, a right partition represents functions associated with other third parties, for example, vendors or providers to a central service, regulatory agencies, and so forth.

As for the client network, seen at the left side of the FIG., configuration is typically left in the hands of a client administrator; the client network ideally supports infrastructure for establishing a secure tunnel with the security service for configuration, management and backend actions as appropriate. This functionality is represented generally by reference numeral 1009. In implementations that do not involve a web interface, the client network can be provided with a client module or specialized software that allows it to perform local configuration and interaction with the ACP or remote configuration in connection with the central service; this software and its installation and control over a machine (i.e., a computer) is symbolized by icons 1015 and 1017 in FIG. 10. As denoted by ellipses 1018, client responsibilities identified by the left partition is typically replicated at least partially for each client or private network supported by the core functions 1007.

The middle partition of FIG. 10 represents functions that can be associated with a central query routing service. The associated responsibilities include providing the core functions (e.g., query routing and/or search capability, and optionally including event logging, etc.) 1007, infrastructure for routing communications and managing profile information and/or group memberships for client networks, query channels and so forth 1019, and encryption and authentication (including VPN tunneling) services 1021. In addition, the security services network can also include modules to handle payment for third party software licenses and other costs, and to invoice its clients receiving security services, per numerals 1023 and 1027. For example, one contemplated business model supports a micropayments form of licensing, where client networks are invoiced on a subscription or a "pay-as-you go" basis (e.g., dependent on volume of use). To provide one example, depending on the license fee structure utilized, a client installing a5nd operating services sporadically can be invoiced for 1 day's use only, or on another abbreviated basis. Fees can also be charged for external queries, for example, depending on the number of queries or volume searched. Naturally, no fee or subscription-based models can also be used, e.g., a client network can be charged, without limitation, a flat fee, a monthly fee, an annual fee, a per service flat, monthly or annual fee, or on some other basis. The software that implements and supports these various functions, and the machine or machines that the software controls, are collectively represented using icons 1029 and 1030.

Note that the network of the security service provider communicates with different entities; (a) multiple clients, represented by the left partition, each one of which has one or more of the responsibilities represented by numerals 1006, 1011, 1013 and 1015, and (b) one or more third party entities such as services providers to the central service, represented by the right partition, such as software licensors and regulatory authorities; these entities are represented by numerals 1031, 1032 and 1035.

Elaborating on structure that can be outsourced or run as a complementary service to the security services network, the outsourcing of data center management provides a first example, 1031. If a third party provides this support, e.g., for cloud based event storage, the license payments function of the service provider network includes payment functions as appropriate to compensate the data center providers, e.g., these payments if desired can be tracked and invoiced to the account of the client network they are used to support. Similarly, if per-use or per-client software fees are paid to individual software vendors, then license payments (and support as necessary) are provided to (and from) these entities, as represented by numeral 1032; note that a trusted link can be established for this purpose, e.g., to provide visibility and messaging access to support personnel. Other subscriptions and the optional outsourcing of client billing (e.g., for security services received) is represented by numeral 1033; again, such entities can be provided with trusted access, such as incremental billing information for each private network receiving security services. Also, an information repository or sharing service may also be outsourced, or provided by another vendor. Generally speaking, any number of service providers to the security services network can be meshed with the security services network as represented by continuation arrow 1041. If necessary, the security services provider network can also provide these third parties with access into the security services provider network, for audit, accountability or other purposes.

A special case is presented by boxes 1025 and 1035, labeled "regulatory." For some fields of endeavor, particularly when dealing with health and safety, national security and financial administration, information possessed by the client network can be tightly regulated by or involve interaction with governmental authority (e.g., with the FBI, to for example receive or provide information regarding directed attacks). Therefore, if warranted by the implementation and the specific business model, a third party entity (e.g., a regulatory agency, such as an agency of the government) can be provided with partial or complete visibility into the security and security networks of specific clients. Note that software modules to support any of the above interactions can be provided to these latter entities, as depicted by software and machine readable media icons 1037 and 1039; generally speaking, these modules support authentication and "trusted partner" connectively, to enable or facilitate electronic interactions with the security services provider, as described above.

It should be appreciated that this disclosure provides specific examples of system, methods, services and software that greatly enhance network security. For example, this disclosure facilitates the pooling of security event related data among cooperating networks and effective, customized or automatic filtering of sanitized results. These techniques can be extended to any private network, a centralized service (e.g., operated as a service bureau), commercial software products, or another form of implementation.

Other applications will readily occur to those who design electronics or software in view of the teachings provided above, or in view of the invention defined by the claims set forth below. Accordingly, the foregoing discussion is intended to be illustrative only; other designs, uses, alternatives, modifications and improvements are also possible which are nonetheless within the scope of the present disclosure, which is limited and defined only by the following claims and equivalents thereto.

We claim:

1. A system, comprising:
    a memory; and
    a processor communicatively coupled to a first network device via a first network, wherein the processor is configured to:
        generate a first notification, wherein the first notification comprises an event detail related to a threat to the first network device, wherein the event detail comprises a property of the first network device;
        sanitize the first notification to remove an identity of the first network device, an identity of the first network, or both from the event detail;
        transmit the first notification to a central service that determines that both the first notification and a previously received threat notification via a second network from a second network device relates to the property of the first network device and adjusts a threat ranking of the first notification responsive to the determination;
        receive the adjusted threat ranking associated with the first notification from the central service; and
        perform a remedial action in response to receiving the adjusted threat ranking.

2. The system of claim 1, wherein sanitizing the first notification comprises removing a network address associated with the first network device, the first network, or both, from the event detail.

3. The system of claim 1, wherein the remediation action comprises downloading an upgrade to the memory to mitigate security vulnerabilities associated with the threat.

4. The system of claim 1, wherein the central service is configured to transmit the adjusted threat ranking to the second network device.

5. The system of claim 1, wherein the property corresponds to an indication of an operating system.

6. The system of claim 1, wherein the memory comprises remedial action data associating a respective remedial action to a respective threat ranking of a plurality of threat rankings.

7. The system of claim 1, wherein the processor is configured to determine the remedial action from the first notification, wherein the first notification comprises an indication of the remedial action to be performed.

8. The system of claim 1, wherein the property corresponds to an indication of a service provider associated with the first network device.

9. The system of claim 1, wherein the adjusted threat ranking indicates the remedial action without including an identity of the second network, and wherein the central service is configured to transmit the adjusted threat ranking to the second network, the second network device, or both.

10. The system of claim 1, wherein the processor is configured to generate the first notification as an alert in response to detecting the threat.

11. A method, comprising:
generating a first notification in response to detecting a threat to a first network, wherein the first notification comprises an event detail that includes a property associated with a first network device and an identity of the first network device, an identity of the first network, or both;
sanitizing the first notification to remove the identity of the first network device, the identity of the first network, or both from the event detail;
transmitting the first notification to a central service via a second network, wherein the central service is configured to determine that both the first notification and a previously received threat notification from a second network device relate to the property and adjust a threat ranking of the first notification responsive to the determination; and
receiving the adjusted threat ranking associated with the first notification from the central service via the second network.

12. The method of claim 11, comprising performing a remedial action in response to receiving the adjusted threat ranking.

13. The method of claim 11, comprising transmitting the adjusted threat ranking to a third network device, wherein the first network device is configured to couple to the third network device via the first network.

14. The method of claim 13, wherein the first network is separated via a firewall from the second network.

15. The method of claim 11, wherein the property corresponds to an indication of an operating system.

16. A non-transitory, tangible, computer-readable medium storing instructions that, when executed by a processor of a network device communicatively coupled to a central service via a first network, cause the network device to:
generate a notification, wherein the notification comprises an event detail related to a threat to the network device, wherein the event detail comprises a property of the network device;
sanitize the notification to remove an identity of the network device, an identity of a second network, or both from the event detail;
transmit the notification to the central service;
receive an adjusted threat ranking associated with the notification from the central service; and
perform a remedial action in response to receiving the adjusted threat ranking.

17. The non-transitory, tangible, computer-readable medium of claim 16, wherein the instructions cause the network device to:
receive an additional notification from the central service comprising the adjusted threat ranking, wherein the additional notification is generated in response to the central service matching the notification to a previously received notification from another network device based on the property; and
identify a software version associated with the previously received notification based on the additional notification.

18. The non-transitory, tangible, computer-readable medium of claim 16, wherein the instructions cause the network device to replace a previous threat ranking with the adjusted threat ranking in memory.

19. The non-transitory, tangible, computer-readable medium of claim 16, wherein the instructions cause the network device to perform an assessment to predict theft or damage if an attack were to be completed, perform a vulnerability assessment, or both.

20. The non-transitory, tangible, computer-readable medium of claim 16, wherein the instructions cause the network device to select the remedial action from a plurality of remedial actions indicated via the adjusted threat ranking based on a ranking of respective remedial actions of the plurality of remedial actions against each other.

* * * * *